United States Patent [19]

Fantone

[11] Patent Number: 5,416,574
[45] Date of Patent: * May 16, 1995

[54] AUTOMATED OPTICAL MEASUREMENT APPARATUS

[75] Inventor: Stephen D. Fantone, Lynnfield, Mass.

[73] Assignee: Optikos Corporation, Cambridge, Mass.

[*] Notice: The portion of the term of this patent subsequent to Jan. 18, 2011 has been disclaimed.

[21] Appl. No.: 994,890

[22] Filed: Dec. 22, 1992

Related U.S. Application Data

[63] Continuation-in-part of Ser. No. 677,260, Mar. 29, 1991, Pat. No. 5,280,336.

[51] Int. Cl.$^6$ .................................. G01B 9/00
[52] U.S. Cl. ............................................. 356/124
[58] Field of Search ............... 356/124, 125, 126, 127, 356/123, 128; 351/212, 247; 250/201.1, 201.2, 201.3, 201.7

[56] References Cited

U.S. PATENT DOCUMENTS

| | | | |
|---|---|---|---|
| 2,466,015 | 4/1949 | Ewing | 356/124 |
| 3,447,874 | 6/1969 | Back | 356/124.5 |
| 3,740,150 | 6/1973 | Munnerlyn | 356/124 |
| 3,856,407 | 12/1974 | Takeda et al. | 356/123 |
| 3,904,294 | 9/1975 | Gold et al. | 356/124 |
| 4,149,801 | 4/1979 | Volk | 356/124 |
| 4,213,701 | 7/1980 | Lanzilloti | 356/124 |
| 4,588,270 | 5/1986 | Tamaki | 351/212 |
| 4,653,923 | 3/1987 | Kitabayashi | 356/124 |
| 4,818,108 | 4/1989 | Eppinger | 356/124 |
| 4,920,273 | 4/1990 | Sacks et al. | 250/560 |
| 4,963,724 | 10/1990 | Neumann | 250/201.3 |
| 5,280,336 | 1/1994 | Fantone | 356/124 |

FOREIGN PATENT DOCUMENTS

| | | | |
|---|---|---|---|
| 0118639 | 6/1986 | Japan | 356/124 |
| 2-0205704 | 8/1990 | Japan | 356/124 |
| 719700 | 12/1954 | United Kingdom | 356/124 |

*Primary Examiner*—Hoa Q. Pham

[57] ABSTRACT

A system for the automatic measurement of parameters of optical elements such as radii of curvature, thickness, power, index of refraction, and focal length including the radii of curvature of convex or concave optical surfaces such as those of lenses, molds, lathe turned optics, inserts, ball bearings or micro-optics. The system includes a computer for control, operator interfacing, and analysis, along with an optical head for providing signals from which parameters can be calculated.

20 Claims, 20 Drawing Sheets

AUTOMATED OPTICAL MEASUREMENT APPARATUS

CROSS REFERENCE TO RELATED APPLICATION

This application is a continuation-in-part of U.S. patent application Ser. No. 07/677,260 filed on Mar. 29, 1991, now U.S. Pat. No. 5,280,336, in the name of Stephen D. Fantone with the title, "AUTOMATED RADIUS MEASUREMENT INSTRUMENT".

BACKGROUND OF THE INVENTION

1. Field of the Invention

This invention generally relates to methods and apparatus for testing optical systems and particularly to devices and techniques for the automated measurement of a variety of parameters of optical surfaces and/or elements including radii of curvature, thickness, power and focal length.

2. Background of the Prior Art

Throughout the process for fabricating optical systems from the simple to the more complex, it is frequently necessary to determine if, and how well, optical surfaces or elements conform to their designers stated requirements. Not only does the performance of optical systems in final form need to be verified but various parameters of their components need to undergo intermediate testing for conformance with their specifications prior to final assembly as a system. Indeed, even the tools of fabrication, especially molds for the formation of plastic or glass lens elements, need to be tested for compliance with design specifications.

Some of the most frequently encountered measurements that need to be made are radius of curvature of surfaces in either convex or concave form, thickness, power, and various focal lengths. Classically, radii of curvature is measured through the use of a hand-held instrument called a spherometer, which measures the sagittal height (sag) of the surface over a known diameter and then displays the radius of curvature on a dial or other visual display after an internal calculation that relates radius to sag height and the known diameter. However, the accuracy of such devices are prone to relatively large errors because sag heights are usually small dimensions that are difficult to accurately measure mechanically.

A more accurate technique for radii measurement involves the use of an auto-collimating microscope in an arrangement referred to as a radiusscope. Here, one first focuses on the surface to be measured and then on the center of curvature of the surface where a reticle image has been formed back on itself by reflection from the test surface. The positions of the microscope are recorded, and the difference between them represents the radius of curvature to limits of accuracy which depend on the preciseness of the length measurements and the ability of the operator to accurately focus on the reference points.

Where the spherometer suffers from problems of precision, the use of the radiusscope, which can be accurate to microns if care is taken, is time consuming and dependent on operator skill and experience.

The thickness of an optical element is more or less important depending on its assigned role in a particular design and can be critical where the design relies heavily on its precision for aberration control or the like. Thickness obviously can be measured directly by mechanical means which may also be automated, but there is always the danger of damaging part surfaces with mechanical approaches.

Power and focal length are always of interest and can be calculated from classical lens makers formulae having knowledge of the various numerical values required as, for example, index of refraction, radii, and thickness.

While those in the art have provided a variety of ways for measuring many of the foregoing properties of optical elements and systems, there remains a need for an instrument for rapidly and accurately measuring a number of optical properties virtually simultaneously, and it is a primary object of the present invention to provide such a device.

Another object of the present invention is to provide methods and associated devices for automatically measuring radii of curvature, thickness, power and focal length of optical surfaces and/or elements with minimal dependence on operator skill.

Yet another object of the present invention is to provide an automated instrument for providing statistical analysis of quality in high volume production settings.

Still another object of the present invention is to satisfy all of the foregoing objects with a user friendly device that is simple in its implementation and low in cost.

Other objects of the invention will in part be obvious and will in part appear hereinafter. A full understanding of the invention will best be had from reading the detailed description to follow in connection with the detailed drawings.

SUMMARY OF THE INVENTION

An automated measurement system is provided as a non-contacting instrument to measure spherical optical surface radii, thickness, power and focal length in an expedient and accurate manner. The system is comprised of a computer, a special interface board, an optical head, and a light source usually present as a component of the optical head. It's most common use is for the measurement of plastic molded surfaces or elements, lathe turned optical surfaces, and/or inserts for the optical industry. In its customary mode of operation, the surface to be measured is placed on a special, self-centering 3-point assembly and a start button is depressed by an operator. The various optical parameters measured are then presented on an attached computer monitor. Typically, the measurement cycle for a nominally 8 mm radius to accuracies of one part in 2000, or better, takes a few seconds.

Along with this basic capability, a number of additional features are provided. After undergoing a self-check using a mold or other optical surface (presenting the mold as a standard), the instrument can, in less than three seconds, measure the parameters of subsequent parts with the option of writing data to a file for later review. System software can accumulate lot data and provide go/no-go sorting of parts in a production environment for quality control purposes.

The part to be measured must be near spherical in the zone of measurement with a radius within the envelope of the preset internal limits and must provide a specular reflection, although the reflection can be quite low. With the part placed horizontally on the 3-point mount, the system uses an optical imaging analysis technique implemented via an internal analyzer and associated software to first find the rear vertex of the part being tested. The apparent location of the vertex of the second surface as seen through the first surface is then found and the apparent location of the center of curvature, and the center of curvature of the first surface is afterwards located. By definition, the longitudinal difference between the location of the center of curvature of the first surface and its vertex location is the radius of curvature of the first surface. The thickness of the optical element and the radius of curvature are obtained via a relationship between them and the amount of apparent displacement undergone by the instrument head in traveling from the location of the front surface vertex and the rear surface vertex locations. From these values power and focal length are then obtained. As the analyzer scans through each of these locations, the signal at a detector is momentarily peaked and the location of this peak is recorded and processed. Therefore, the desired qualities in such an instrument involve the range of travel of the analyzer and the ability to record the signal peaks. The benefit of the system is that expedient determination of a variety of parameters is achievable. It is easily seen that the process of fabricating contact lens molds, inserts, and the lenses themselves are candidates for usage of such instruments. For example, machinists can measure the precision with which inserts have been generated or assess polishing work throughout the fabrication process. Quality control is another primary usage for such an instrument. Back vertex power, for instance, can be easily calculated from knowledge of the radii of curvature of a lens and its thickness and the optical properties of the material from which it is made. In this way, the characteristics of contact lenses can quickly be measured.

One embodiment provides for the measurement of flange focal length of refractive elements. Here, the system is adapted to include a retroreflecting addition above the lens under test. In this case, light is passed through the lens, reflected, and then passed back through the lens. The analyzer here operates to locate the focus of the lens and location of a reference surface; the difference of these two locations is the flange focal length. In addition, the back focal length and back vertex power, which is the reciprocal of the back focal length, can be obtained by determining the back surface radius and having knowledge of the indices of refraction of the part measured and its surrounding medium.

In a yet another preferred embodiment, a kinematic rotary stage provides the capability for parametric measurements at multiple azimuths across a part thus permitting nonrotational surfaces, including torics, to be studied. Alternatively, the kinematic stage can be replaced by either a rotating Dove, Pechan, or similarly acting, prism as an optical equivalent to the kinematic stage. Finally, it is possible to have more or less simple versions of the system with different measurement capabilities, costs, and ranges of ability through the simple expediency of using microscope objectives with different working distances and associated software.

DESCRIPTION OF THE DRAWINGS

The structure and operation of the invention together with other objects and advantages thereof may best be understood by reading the detailed description in connection with the drawings wherein parts appearing in different drawings have the same reference numeral throughout and wherein.

DETAILED DESCRIPTION

The present invention is a system for rapidly and accurately measuring optical parameters of a variety of optical elements and/or surfaces including those of lenses and mold surfaces for forming them. The system is capable of measuring radii of curvature, thickness, power and focal length and can exist in more or less complex forms depending on a selection of available features and desired range of operation, but in all of its forms, its principle of operation is the same.

Figure 1:
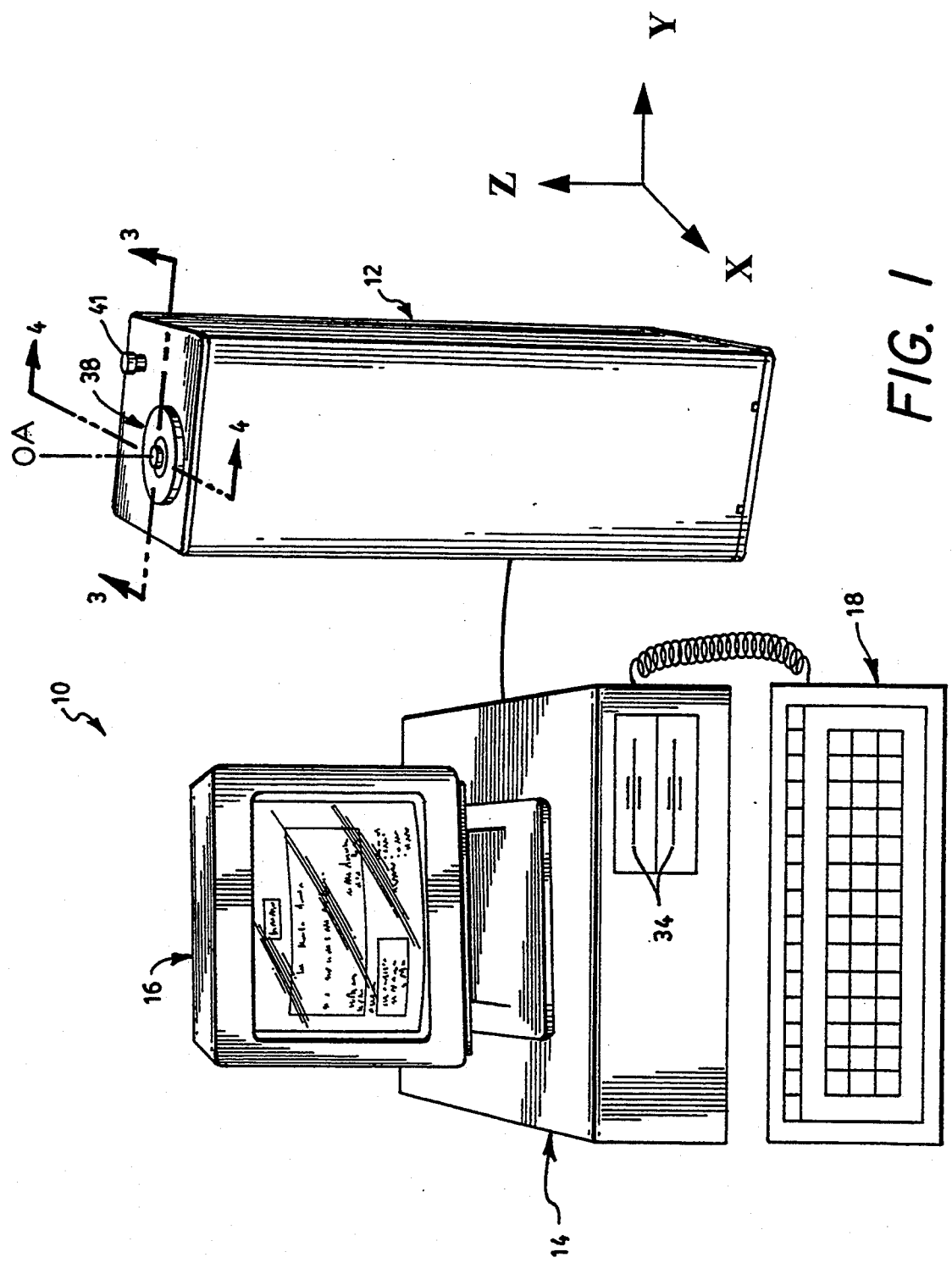
FIG. 1 is a diagrammatic perspective of a preferred embodiment of the inventive radius measuring system having the capability of measuring the convex, concave, and toric surfaces.
Figure 2:
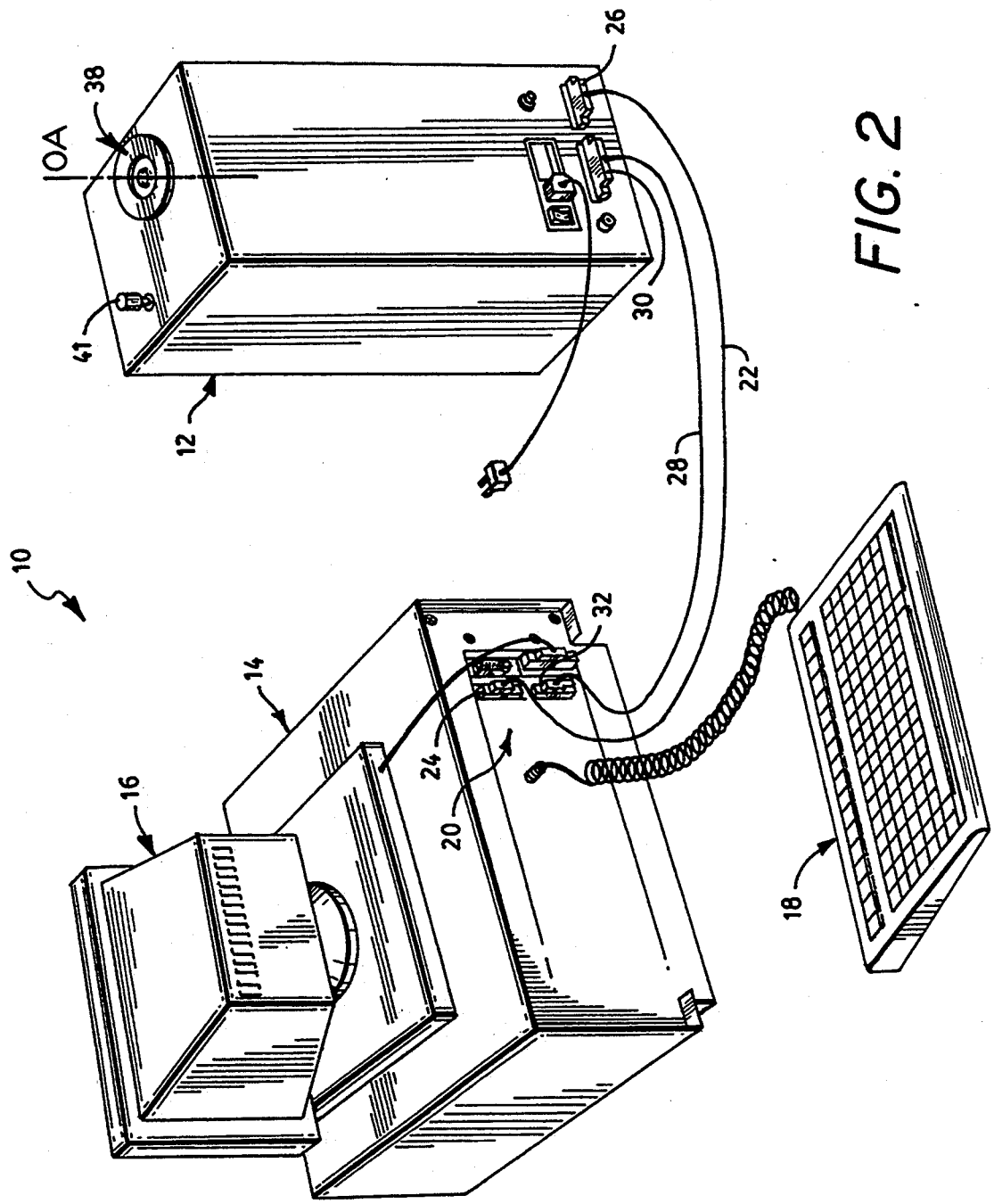
FIG. 2 is a diagrammatic perspective of the rear of the system of FIG. 1.

Within three seconds, for example, a measurement of radius of curvature can be made to an accuracy of less than 2.5 μm error and other parametric measurements can be carried out with similar speeds. A preferred form of the inventive system with the versatility of automatically measuring concave and convex elements over a wide parametric range and along different azimuths of rotation is shown in FIGS. 1 and 2 where it is designated at 10. As can be seen in those Figures, automatic measuring system 10 comprises a vertically oriented optical head 12, an AT, 80286 based computer 14, a monitor 16, preferably color, and a keyboard that is preferably an enhanced type with 101 keys including twelve function keys (F1-F12) arranged above its alphanumeric keys. Optical head 12 is electrically connected to computer 14 via an interface board 20 (FIG. 2) located in one of computer 14's expansion slots. Board 20 is configured in a well-known manner as an I/O board to: provide an electronic link between computer 14 and optical head 12 for the transmission of electrical and logic signals between them; provide drive signals to stepper motors located in optical head 12; and perform certain signal processing operations on raw signals generated by a photodetector in optical head 12.

The electrical link is provided by a pair of cables, 22 and 28, whose ends are each provided with connectors designated as 24 and 26 for cable 22 and 30 and 32 for cable 28. Keyboard 18 operates in the usual way providing the operator with a means for communicating commands to computer 14, and monitor 16 displays a variety of system responses to the operator including measurement dam, system status, and menu options to be selected for system control and direction.

In addition, data and computer instructions in the form of programs may be transferred between operator and computer via one or more disk drives such as those shown typically at 34 in FIG. 1.

Figure 3:
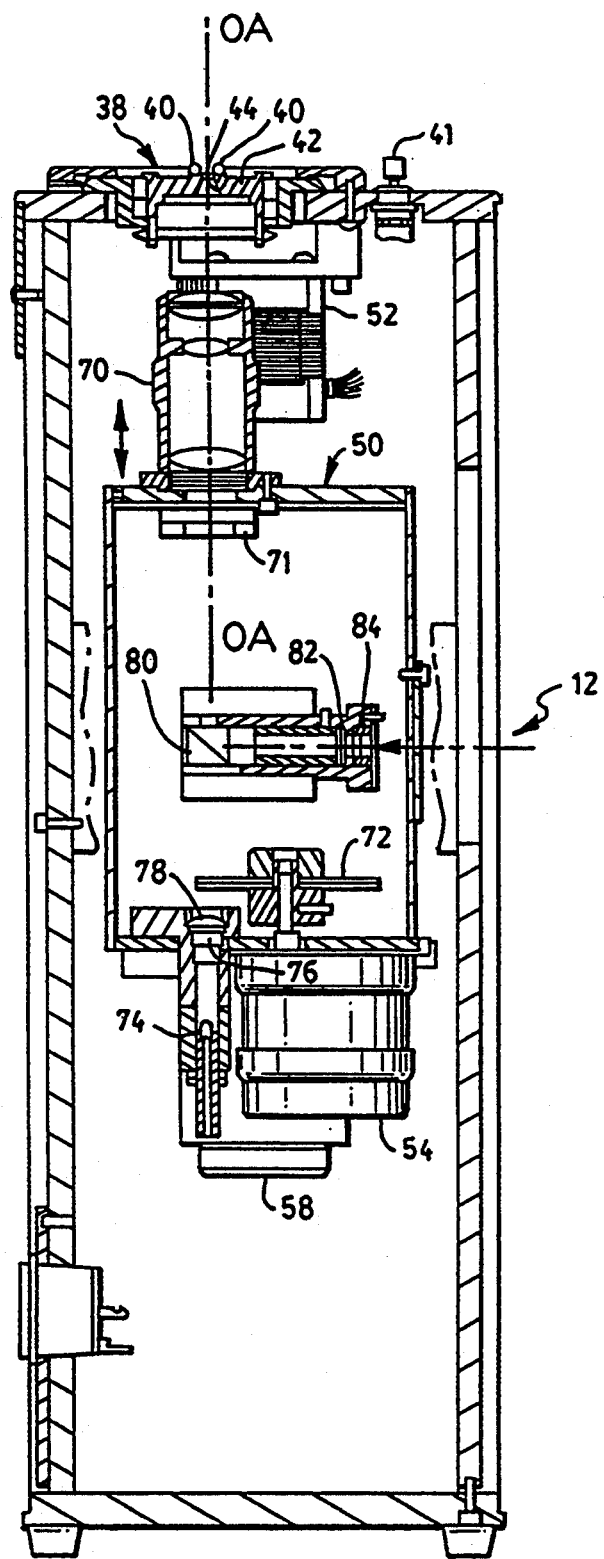
FIG. 3 is a vertical section, with parts broken away, of the optical head section of the system of FIG. 1 taken along line 3—3 therein.
Figure 4:
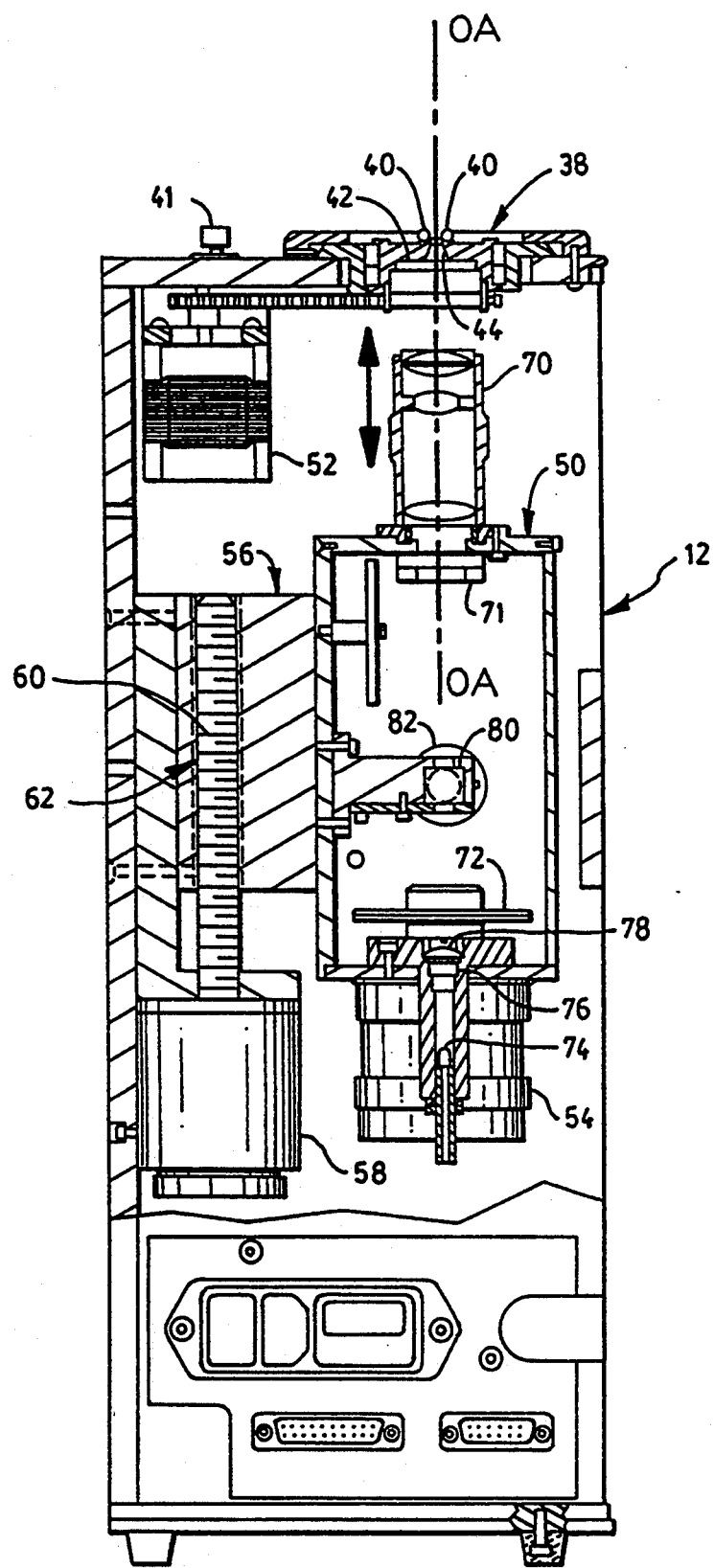
FIG. 4 is a vertical section, with parts broken away, of the optical head section of the system of FIG. 1 taken along line 4—4 therein.
Figure 19:
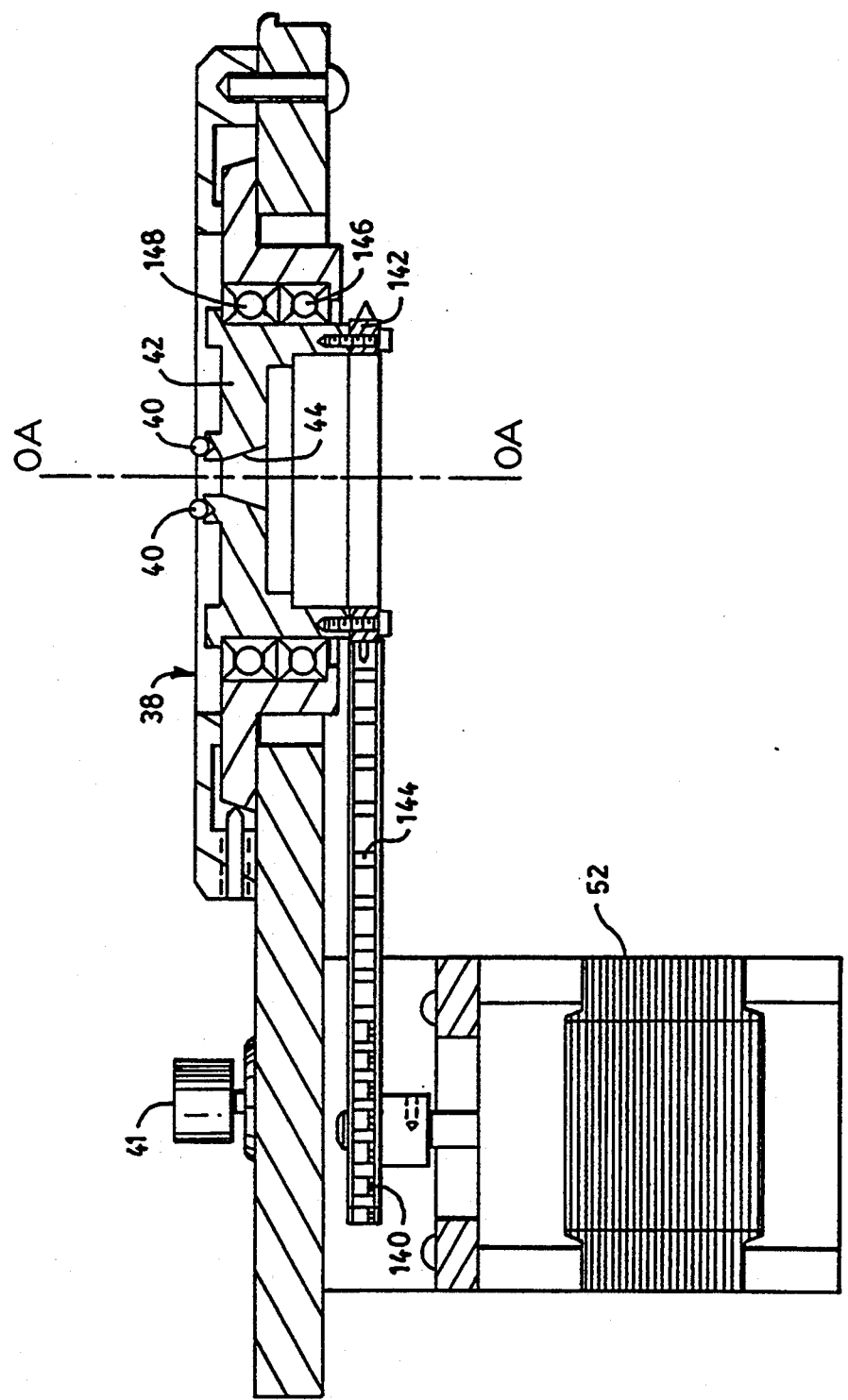
FIG. 19 is an enlarged view of part of the vertical section of FIG. 4 showing in more detail the various parts of the rotary stage of the inventive system.

On top of optical head 12 there is preferably provided a rotary stage 38 for receiving and supporting test optical elements in a reference plane which can be precisely rotated to measure radius of curvature and other parameters along different azimuths of the element under test. However, rotary stage 38 may be omitted where cost is a factor and rotational information is not required. The fixed reference plane, as best seen in FIG. 19, is defined by three nylon balls 40 (only two of which are shown) that are precisely located in a V-groove formed in a nest ring 42 which also has a tapered conical tunnel that extends through to the interior of optical head 12 and is centered about its optical axis, OA; as seen in FIGS. 3 and 4. In this connection, it is to be noted that the three nylon balls 40 also force the center of curvature of spherical surfaces to lie along the optical axis of the instrument. This is so because the various optical components are precisely aligned with the optical axis which, in turn, is made parallel to the mechanical axis of the optical head 12 and mechanical axis is made precisely perpendicular to the plane defined by the balls 40. If only spherical surfaces are to be measured, it is also possible to use a donut instead of the three nylon balls 40. As can be seen in FIGS. 9a and b, test elements, such as those shown as 46 and 48, advantageously are automatically located in the reference plane by this three-ball location arrangement, even if they are slightly tilted about their own axis. When viewed from above, a circle centered on optical axis, OA, and drawn through the centers of each of them defines the semidiameter of the reference plane from which surface sag height can be reckoned.

Referring now to FIGS. 3 and 4, which show the interior of optical head 12, it is seen to further comprise a scanning head 50, which can be vertically moved along optical axis, OA, via a translation stage 56 that, in turn, is driven via a lead screw 60. Precision lead screw 60 is driven by a precision stepper motor 58 fixed to the rear wall of optical head 12 and under command of computer 14. Translation stage 56 moves parallel to optical axis, OA, on a complementary configured precision slide arrangement not shown in detail, but generally designated at 62 in FIG. 4. The pitch of lead screw 60 and the rotational steps of motor 58 are preferably selected in a well-known manner so that each step of the stepper motor 58 moves the scanning head 50 up or down by a small fraction of a millimeter. The accuracy of this stepping motion can be improved by the use of encoders which directly measure translation of stage 56 at each step. In addition to improving accuracy, encoders can also be utilized in minimizing inaccuracies due to wear, especially in the precision lead screw assembly 60. Computer 14 is programmed in a well-known manner to keep track of the position of scanning head 50. In addition, limit switches may be provided to prevent scanning head 50 from mechanically interfering with any structure beneath rotary table 38 and also provide a locating signal indicating that scanning head 50 has reached its uppermost position when closed. In this manner, means are provided for precisely moving scanning head 50 along optical axis, OA, while at the same time providing a signal by which its vertical position can be monitored and controlled via computer 14.

Figure 5:
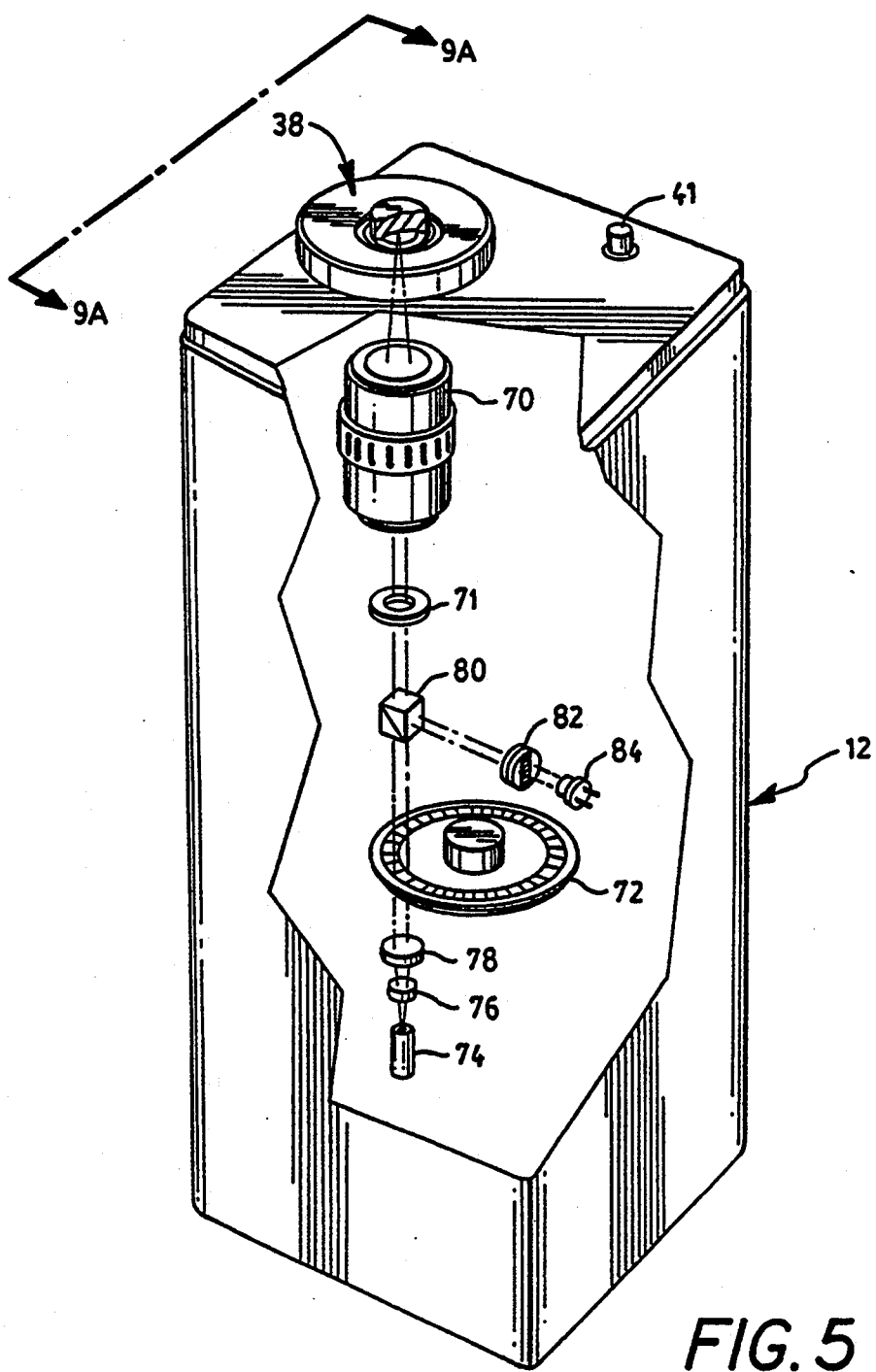
FIG. 5 is a diagrammatic perspective of the optical head of the system of FIG. 1 showing in phantom various optical components, the rotary nest for a test part, and a detector.
Figure 5A:
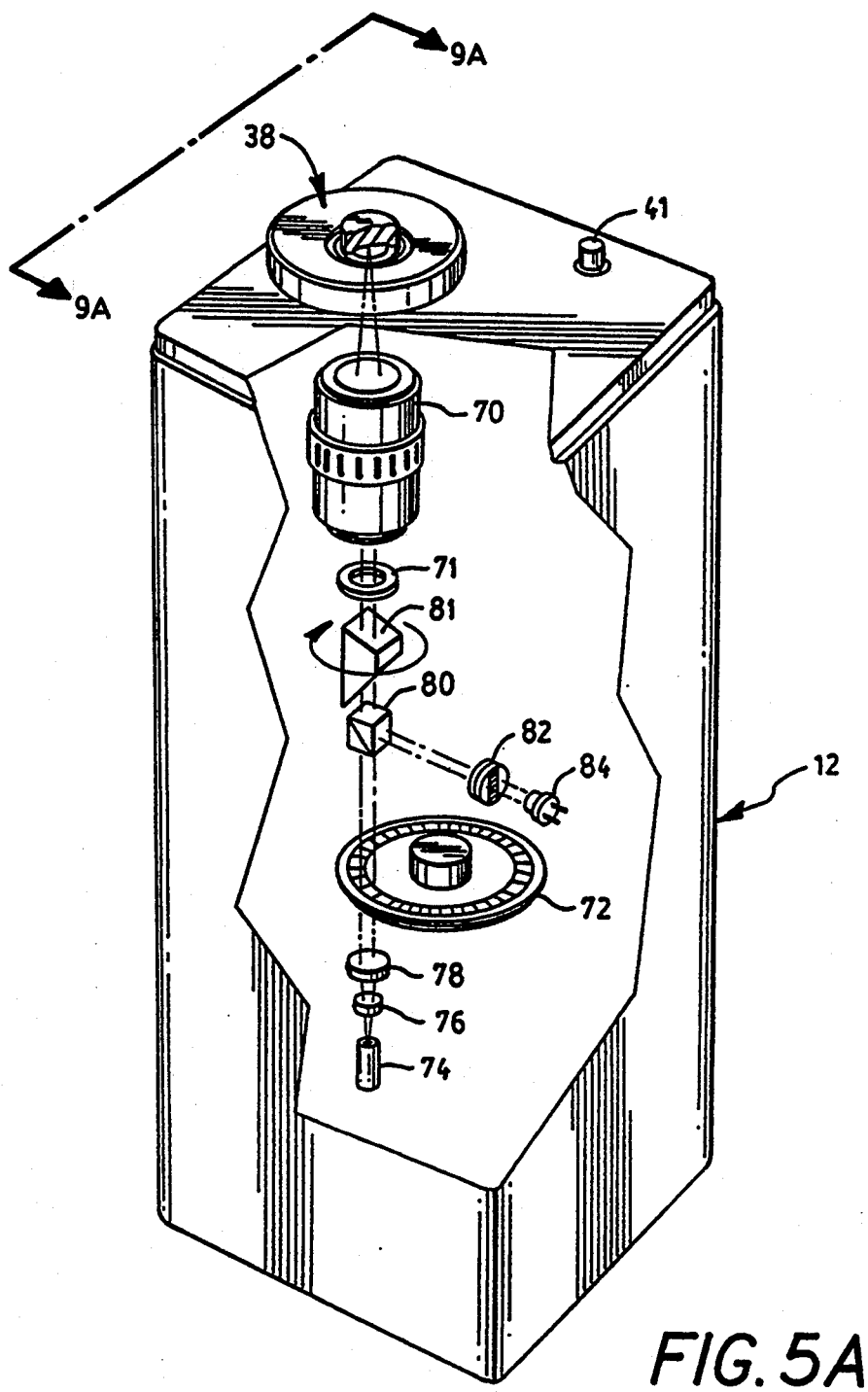
FIG. 5a is a diagrammatic perspective of the optical head of an alternate embodiment of the invention in which a rotating Dove prism replaces the functionality of the rotary nest of FIG. 5.

Scanning head 50 comprises a number of components all of which travel together along optical axis, OA. As best seen in FIG. 5, with occasional reference back to FIGS. 3 and 4, these comprise a microscope objective 70, an adjustable diaphragm 71, a circular grating 72 mounted for rotation about its axis and driven by a clock motor 54, a source of illumination 74 preferably in the form of a light emitting diode (LED), a pair of lenses 76 and 78, a beamsplitter 80 located between objective 70 and grating 72 for purposes of providing a signal branch at right angles to optical axis, OA. Filters may also be used as needed to control the spectral output of the LED. Along the signal branch is a fixed grating 82 that is preferably a segment of a grating like rotating grating 72. Following fixed grating 82 is a silicon photodetector 84 for providing output signals which are transmitted to computer 14 via I/O board 20 where they undergo additional conditioning prior to their passage to computer 14.

Light source 74 is preferably an LED although a laser, fiber optic source, or incandescent lamp may be used. Considerations in the choice of the type of source to use include efficiency, cost, ease of adjustment of light levels, and compactness. The spectral output of the source 74 is important because objective lens 70, being a microscope objective, is in the best case corrected for visible wavelengths. So, the spectral content of source needs to be considered in terms of its impact on signal level because of any longitudinal aberration introduced at wavelengths outside the visible region. In addition, it is important to note that the part being measured may introduce chromatic aberrations if measured with a broader bandwidth source and this may influence measurements in an undesirable way. Consequently, an LED is quite acceptable because it is a narrow source with no speckle or laser coherence problems. In addition, it is fairly monochromatic and easy to modulate. The bandwidth of a narrow LED source for this purpose is typically tens of nanometers wide, not hundreds, and are easily commercially available at low cost. In addition, they require low power to operate and have low heat dissipation.

Following source 74 is a lens system that is optional but when present comprises elements 76 and 78 which are configured to image LED source 74 in the aperture of the objective 70 for reasons of efficiency. The beam impinging on rotary grating 72 does not need to be collimated, and it simultaneously illuminates several periods of rotary grating 72. What is required though is to illuminate grating 72 so that the amount of light passing through the aperture of objective 70 is optimized. In this connection, the adjustable diaphragm 71 is used to adjust the level of illumination to accommodate for variations in signal strength directly related to part diameter and radius.

Figure 7A:
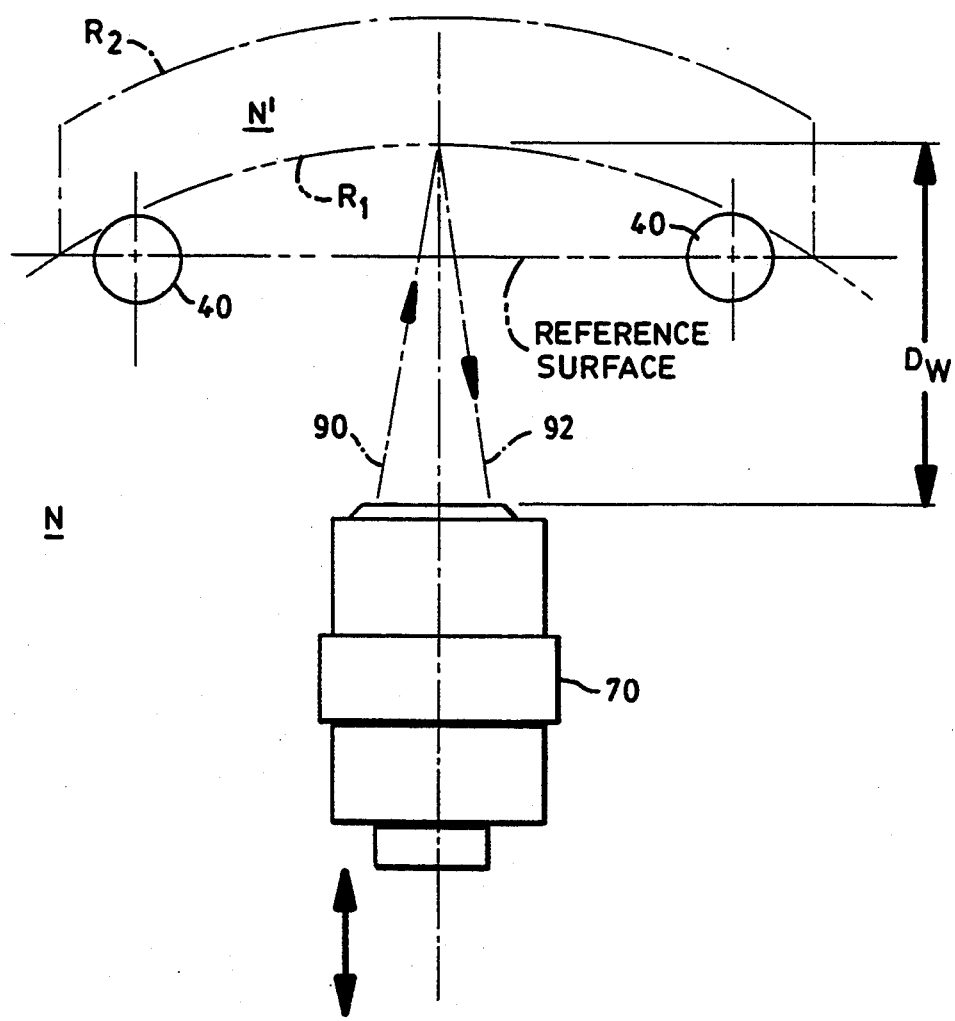
FIGS. 7a and 7b diagrammatically illustrate how a test target is reflected back on itself from the first surface of a part measured when, respectively, the target is imaged from the surface vertex and at its center of curvature.

Rotating grating 72 with a spatial frequency fixed in the range between at about 3 to 6 line pairs/mm thus modulates the pattern of the output beam of LED source 74 to provide a changing illumination pattern while grating 72 is imaged into space behind following microscope objective 70 at its working distance, $D_w$, as best shown in FIG. 7a. As can be appreciated, the working distance, $D_w$, and the mechanics of the system geometry provide limitations on the range of the values of measured parameters, including radii. As an example, a particular 10× objective with a long working distance of 32 mm can be used to measure convex radii between 4 and 28 mm in length, the limitations being due to the physical geometry of the nest and the microscope working distance, $D_w$.

When a surface to be measured is placed so that it rests on the reference plane defined by balls 40, the image of grating 72 is reflected from it and directed back on itself, more or less perfectly, depending on the location of scanning head 50 with respect to the vertices and centers of curvature of the various surfaces comprising an optical element under test, as will subsequently be more fully explained hereinafter. A portion of the reflected image is directed onto fixed grating 82 via beamsplitter 80. When the image on the fixed grating 82 corresponds to its spatial frequency, photodetector output 84 has its highest signal modulation. This is so because of the proximity of fixed grating 82 to the surface of photodetector 84 and the close overlap of the image of rotating grating 72 on a segment of itself, fixed grating 82. At other times, due to defocus, there will be poorer signal modulation because the image presented will not reside in the same plane as fixed grating 84 thereby degrading the throughput of light to photodetector 84 with the resultant output signal level lowered as a consequence.

Figure 6:
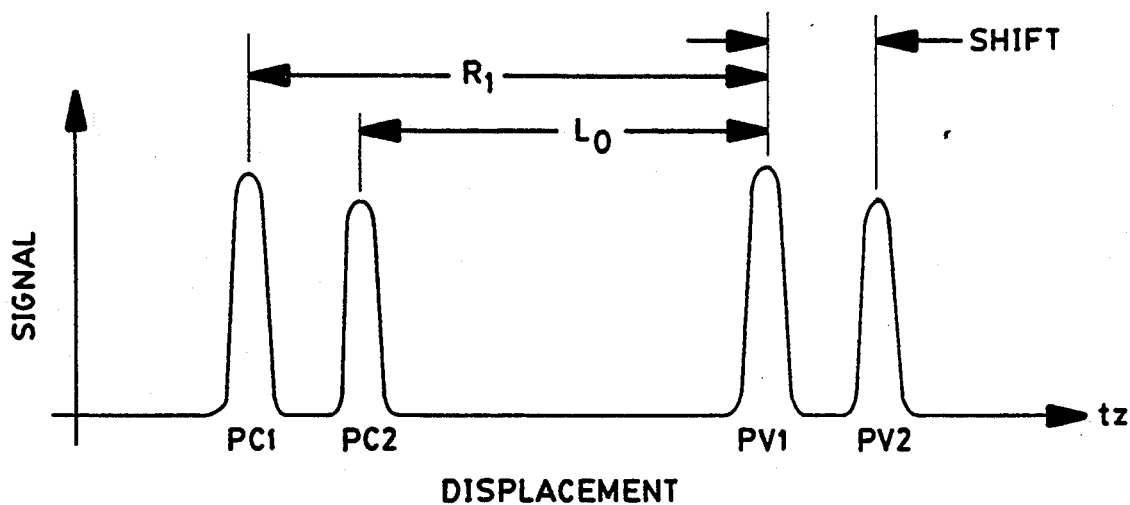
FIG. 6 is a diagrammatic graph showing the signal generated by the system as its optical head is displaced with respect to a part under test along with various relationships among the various peaks of the signal.
Figure 6A:
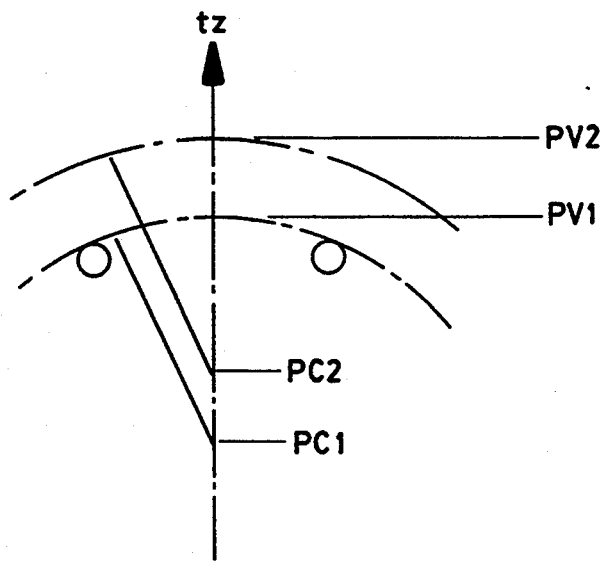
FIG. 6a is a diagrammatic illustration of where various peak signals occur as the translating stage of the invention moves along the optical axis.

As scanning optical head 50 translates up and down, toward and away from an optical element under test, four points are passed through where the signal from photodetector 84 peaks. These signal peaks are shown in FIG. 6 and where they are designated as PV1, PV2, PC1 and PC2 and occur in the manner illustrated in FIG. 6a and the measuring geometry of FIG. 7a>. PV2 and PC2 are slightly lower than the other two because the light from which they are derived is lowered in intensity because it travels through the thickness of the test optical element twice before traveling to photodetector 84 whereas that is not the case with the light responsible for the strength of PC1 and PV1. It is also to be noted that the height of the various peaks are a measure of the quality of the surfaces, particularly signals PC1 and PC2. With the index of refraction known, the various distances between these peaks are used for purposes of determining radii and thicknesses from which other parameters such as power and focal length can be readily calculated. If refractive index is unknown, it can be determined from measurement of the thickness and knowledge of the various parametric relationships of the instrument's measurement scheme. As seen in FIG. 6 and as will become more apparent hereinafter, the distance between PC1 and PV1 corresponds for the radius of the first surface of an element under test, the first surface being understood to be the first one encountered by light from the target. $L_0$ corresponds to the displacement between PC2 and PV1, and the shift corresponds to the displacement between PV1 and PV2.

The relationship between the shift and important physical properties of an optical element under test are given by:

$$\text{shift} = \frac{tN}{N' - (N' - N)t/R_1}$$

where:
shift is the displacement of the optical head between selected signal peaks,
t is the thickness of the optical element,
N is the index of refraction of the surrounding medium with air being 1.0,
N' is the index of refraction of the optical element,
$R_1$ is the radius of the first surface, and
Positive radii have centers of curvatures to the right of surfaces.

The shift can be thought of as the distance that optical head 50 must travel from the location of the vertex of the first surface to the location of the vertex of the second surface as seen through the first surface.

The relationship between the axial thickness, t, of an element under test and the shift and various other parameters is given by:

$$t = \frac{\text{shift} N'}{N + (N' - N)\text{shift}/R_1}$$

where:
shift is the displacement of the optical head between selected signal peaks,
t is the thickness of the optical element,
N is the index of refraction of the surrounding medium with air being 1.0,
N' is the index of refraction of the optical element, and
$R_1$ is the radius of the first surface and positive radii have their center of curvatures to the right of surfaces.

The relationship between the radius of curvature of the second surface, $L_0$, the power of the first surface and various other known properties of an element under test is given as follows:

$$R_2 = \frac{-L_0(N'/N)}{1 - (L_0 \phi_1 N'/N)} - t$$

where:
$R_2$ is the radius of the second surface,
$L_0$ is the distance between selected signal peaks,
N' is the index of refraction of the optical element,
N is the index of refraction of the surrounding medium and is 1.0 for air, and
$\phi_1$ is the power of the first surface and is given by:

$$\phi_1 = \frac{N' - N}{R_1}$$

where:
$\phi_1$ is the power of the first surface,
$R_1$ is the radius of the first surface,
N' is the index of refraction of the optical element, and
N is the index of refraction of the surrounding medium and is 1.0 for air.

Having measured or otherwise determined various values from the foregoing equations, the overall power of a test element is known to be:

$$\phi = \phi_1 + \phi_2 3 1 t \phi_1 \phi_2 / N'$$

where:
$\phi$ is the power of the optical element,
$\phi_1$ is the power of the first surface,
$\phi_2$ is the power of the second surface,
t is the thickness of the optical element, and
N' is the index of refraction of the optical element.
An alternate form for the power is as follows:

$$\phi = (N' - 1)(1/R_1 - 1/R_2) + \frac{t(N' - 1)^2}{N' R_1 R_2}$$

where:
$\phi$ is the power of the optical element,
$R_1$ is the radius of the first surface,
$R_2$ is the radius of the second surface,
t is the thickness of the optical element, and
N' is the index of refraction of the optical element The reciprocal of the overall power is the focal length. Other quantities such as back vertex power and back focal length can be readily calculated from the lens constructional data and equations which are well-known in the literature as, for example, in MODERN OPTICAL ENGINEERING, Warren J. Smith, McGraw-Hill Book Company (1966).

Having explained the type of signal generated by system 10, the meaning of the various signal peaks and the various relationships between where signal peaks occur and test element parameters, how the signal peaks are generated will now be taken up in more detail.

One of the points where a peak occurs is at PV1. This peak occurs where grating 72 and its image are superimposed when the image of it formed at the working distance of microscope objective 70 is at the apex of the test surface as illustrated in FIG. 7a. Here, the incoming rays, 90 for example, reflect in accordance with the laws of reflection to follow exactly along a reversed path back into microscope objective 70. Ray 92, for example, is the return path for ray 90. This is like a cats eye situation with a mirror in the focal plane behind a lens. In this case, the ray that goes in the top, gets reflected at the focal point and then goes out the bottom. It is not a retro in the true sense, but a ray that goes in the top comes out the bottom and back. A ray that enters from the bottom hits a mirror in focus and goes out the top. Consequently, the image is inverted since the rays are interchanged. And, this works for both convex and concave surfaces because rays that enter from the top in each case hit a surface as a ray normal to that surface so that it just retraces its path. To appreciate that this is true, imagine a circle centered on the focal point and trace a ray from a convex surface through the center of the focus and to the opposite side of the circle. This is a concave side with the ray intercepting it also as a normal. So, in both cases, the rays behave the same regardless of the sense of curvature. What works for one, works for the other.

Figure 7B:
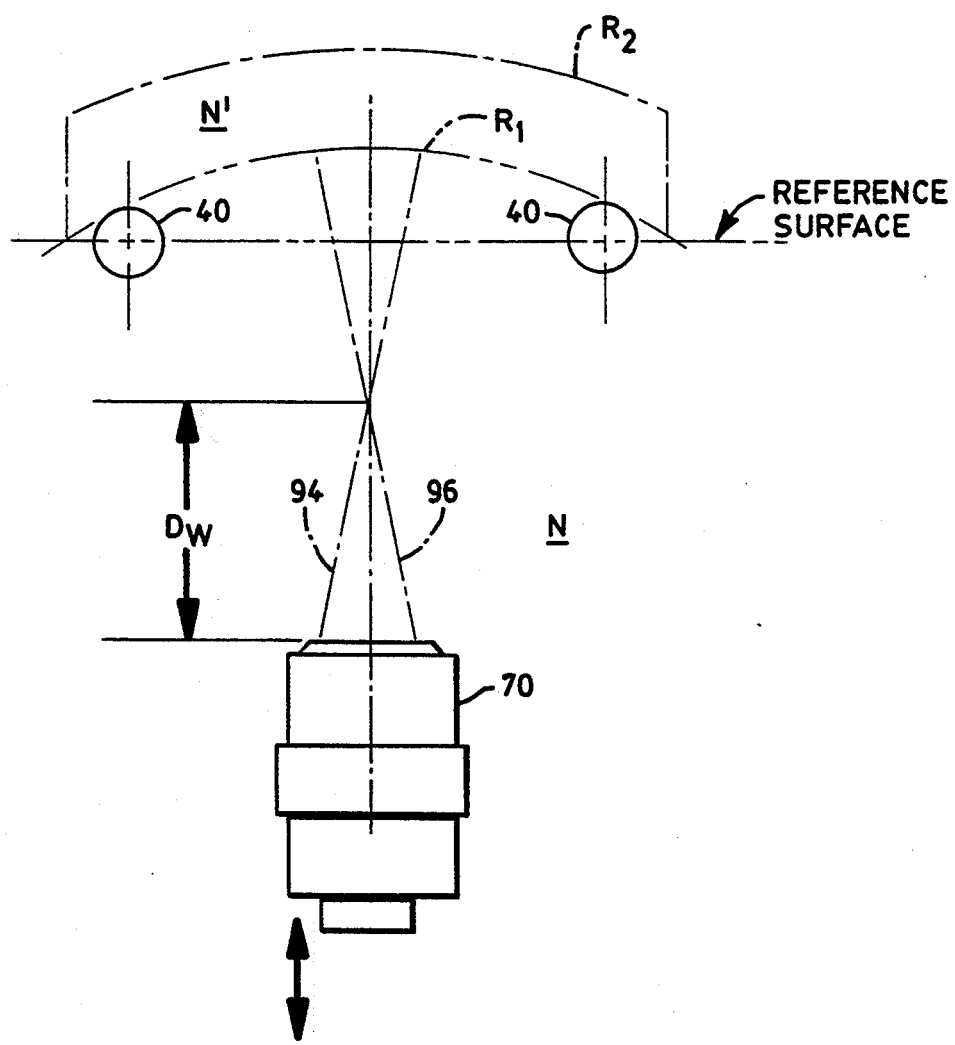

Another point at which a peak signal occurs is when the image at the working distance of microscope objective 70 is at the center of curvature of the first surface of an element under test or at PC1, again either concave or convex. This is illustrated with a concave first surface with radius $R_1$ as shown in FIG. 7b. Here incoming rays, 94 and 96, in this case are retroreflected back on themselves since they are incident to the first surface at right angles.

The distance between the locations where the peak signals occurs is the radius of curvature of the first surface $R_1$ (FIG. 6) which is detected and quantified in a manner to be described.

Figure 8A:
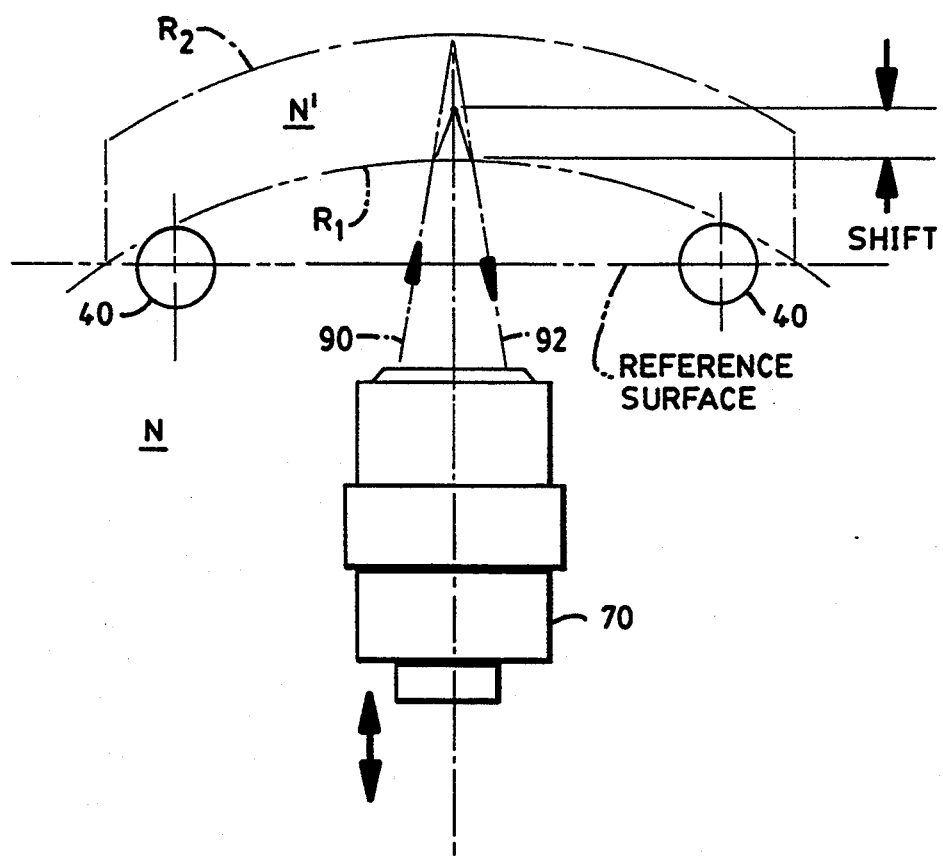
FIGS. 8a and 8b diagrammatically illustrate how a test target is reflected back on itself from the second surface of a part to be measured when, respectively, the target is imaged from the vertex of the second surface and at its center of curvature both as "seen" through the first surface of the part measured.
Figure 8B:
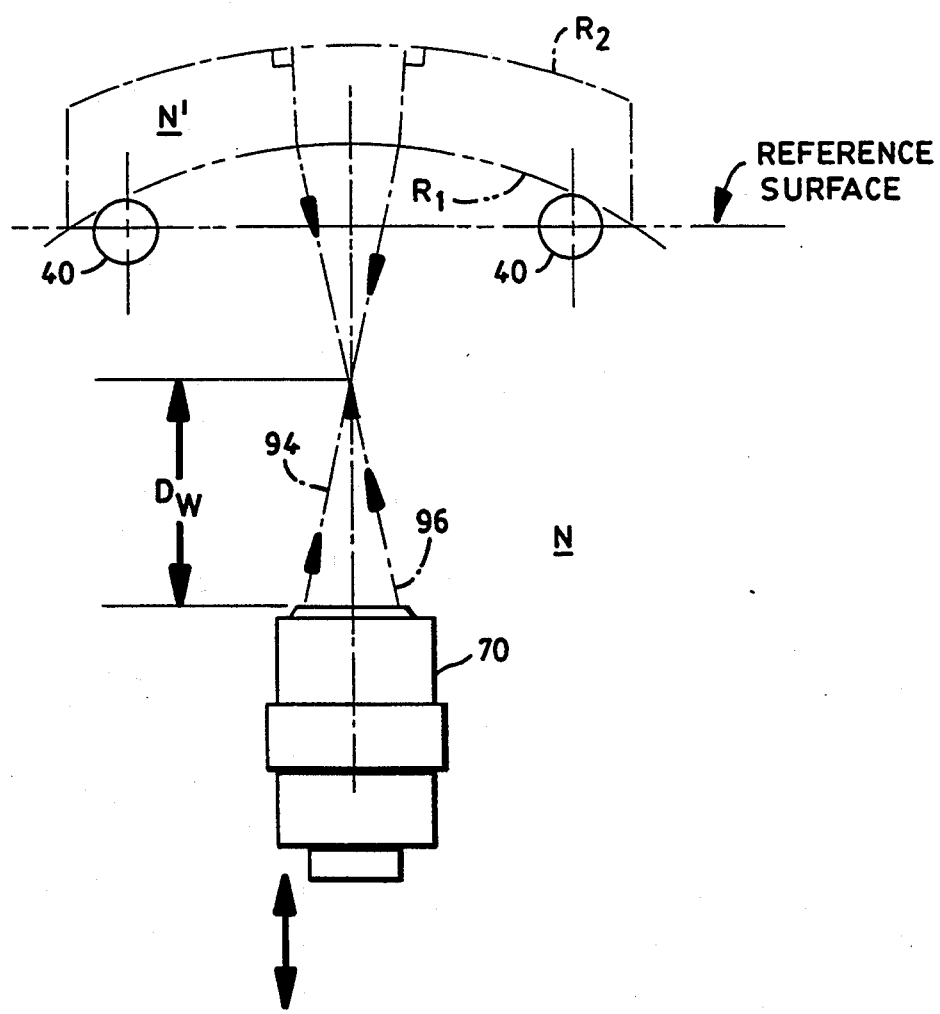

Another location where a signal peak occurs is similar to what takes place in FIG. 7a but with an important difference. The peak referred to is the one labeled PV2, and the difference, which is illustrated in FIG. 8a has to do with the fact that the incoming rays 90 and 92 are refracted by the first surface to travel along a foreshortened optical path to a focus before being reflected from the back surface of radius $R_2$ and then being retroreflected to photodetector 84. The shift as shown is, once again, the displacement of lens 70 from the location of the vertex of the first surface to the apparent location of the vertex of the second surface as "seen" through the first surface.

The final peak, PC2, occurs for reasons similar to those already given with reference to FIG. 7b. except, again, incoming rays 94 and 96 experience a slightly different optical path because they are refracted by the first surface before normally reflecting off of the second surface after which they then travel back toward photodetector 84, again slightly reduced in intensity because of the loss experienced in passing twice through the thickness of the optical element under test.

Thus, this technique of having a fixed grating and a rotating grating used in conjunction with a detector is really means for detecting focus. It involves taking the image of rotating grating 72 reflected from the test surface and superimposing that on a reference grating of like spatial frequency, but inverted in image sense, so that when the superimposed images are slightly out of focus, the image made of that grating being defocused is slightly softer. However, as the image of the rotating grating 72 is moved, the signal modulation that occurs is not as great as it would be when focus is perfect. The basic scheme then is one for reliably detecting focus at important points of interest and providing a readout on its quality in a relatively short period of time. In this case, because rotating grating 72 modulates the Moire pattern at roughly three and one-half kilohertz, it means that in a thousandth of a second or faster, the quality of focus can be known. As the whole scanning head 50, the grating, fixed detector, and the lens move from one position to the other, it only takes a thousandth or so to establish whether or not focus is sharp. In this way, a signal is provided that changes in a rapid way and to allow for rapidly discriminating changes in the quality of the focus.

Figure 8C:
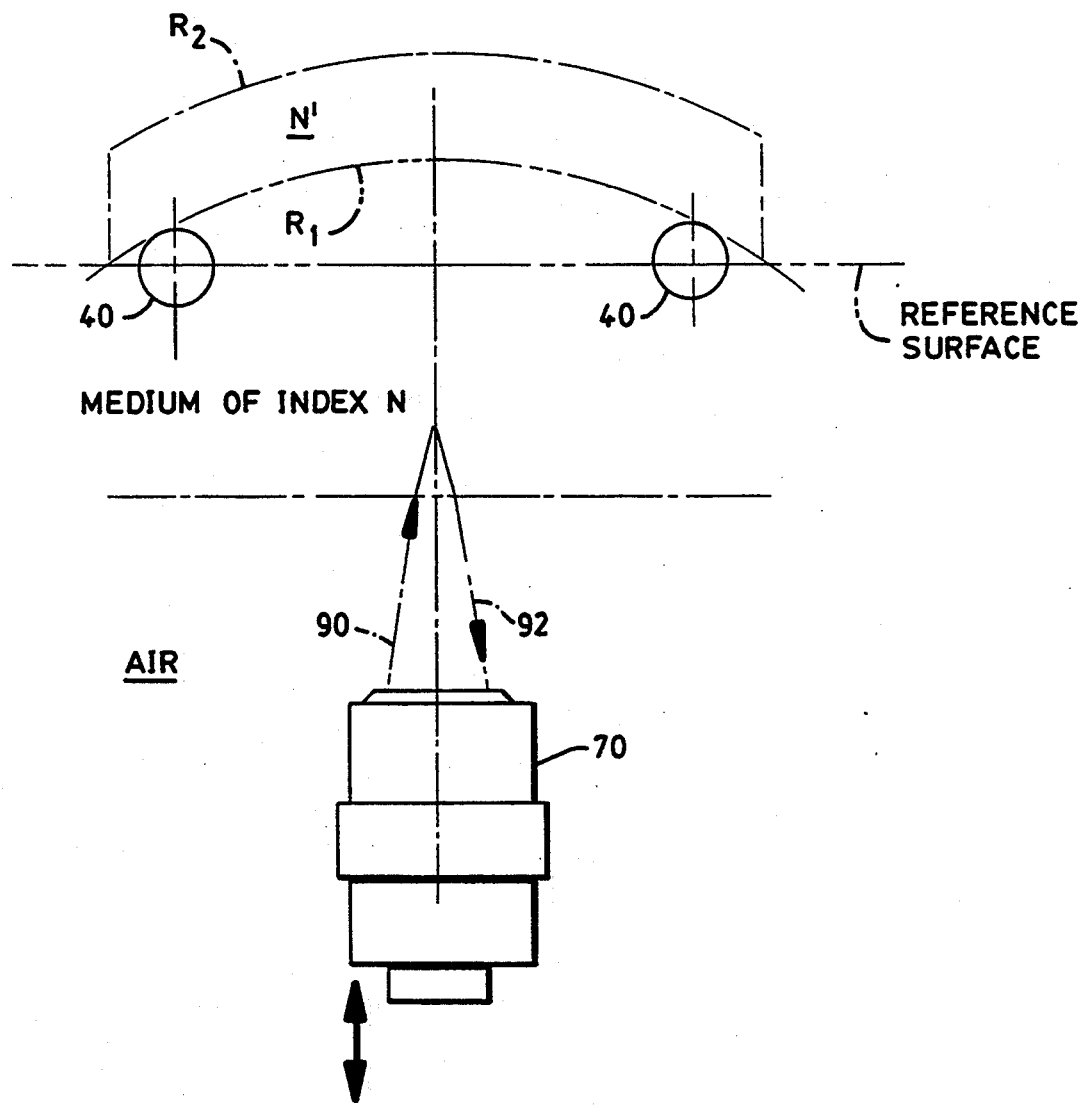
FIG. 8c is a diagrammatic illustration, similar to FIG. 7a, showing the optical stage of the invention as it approaches the rear vertex of a part that is surrounded by a medium of index N other than air.

Reference is now made to FIG. 8c, which shows the optical stage of the invention as it approaches the rear vertex of a part that is surrounded by a medium of index N other than air. This illustrates that a test part immersed in a medium other than air with an index of 1.0 can be measured. Here, the shift in the various equations appearing hereinabove is still the distance moved along the axis to determine when a vertex has been encountered. However, in the equations, the calculations are carded out by replacing N with its appropriated value. Thus, this technique may be used to measure test lenses that have been immersed in various transparent solutions.

Figure 10:
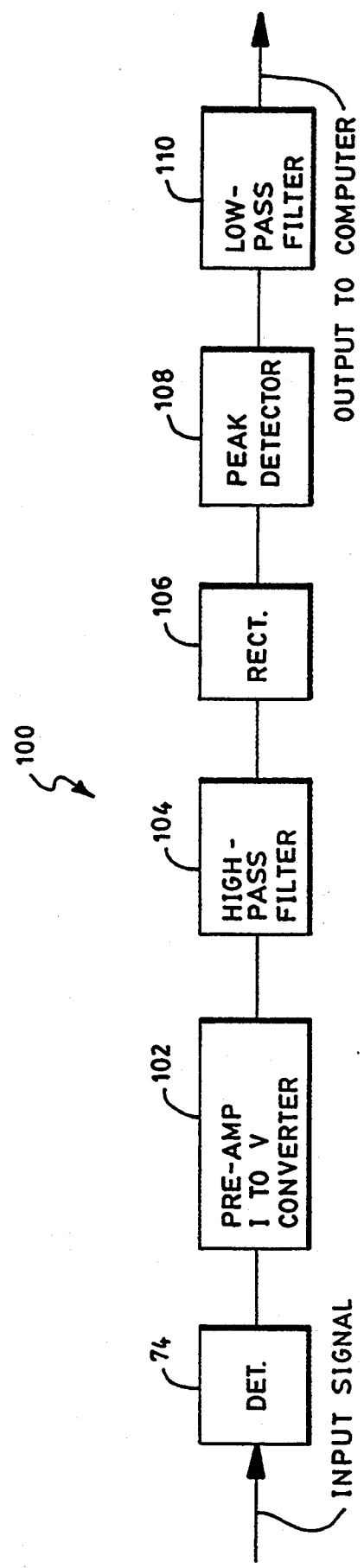
FIG. 10 is a block diagram of the detector and signal processing components of the inventive system.

Prior to any algorithmic operations, the basic signal from photodetector 84 is first conditioned by a signal processor generally designated at 100 in FIG. 10. Processor 100 comprises a preamplifier 102, a high-pass filter 104, a peak detector 106, and a low-pass filter 108. All of these components are well-known and of conventional design.

Figure 11:
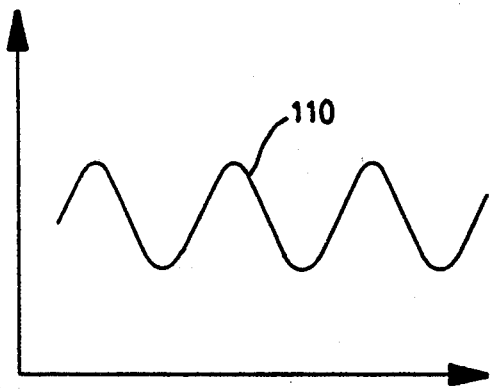
FIG. 11 is a graph of current output with time for a fixed position of the scan head of the inventive system.
Figure 12:
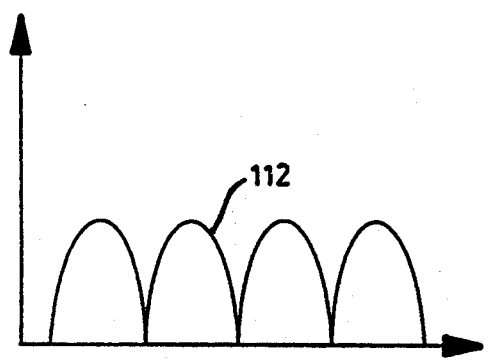
FIG. 12 is a graph of the signal output from the preamp stage of FIG. 10 for a fixed position of the scan head of the inventive system.
Figure 13:
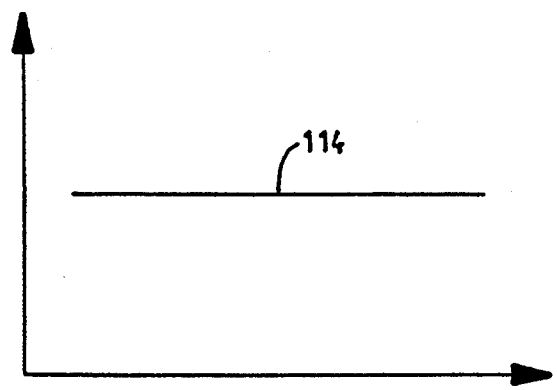
FIG. 13 is graph of the signal from the peak detector of FIG. 10 for a fixed position of the scan head of the inventive system.
Figure 14:
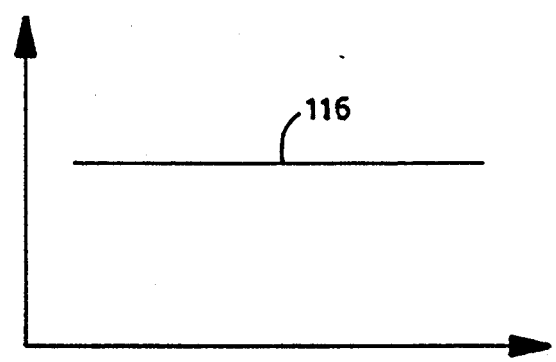
FIG. 14 is a graph of the signal output from the low pass filter of FIG. 10 for a fixed position of the scan head of the inventive system.

The form of the basic signal coming out of photodetector 84 when at one of the four peak signal points is shown diagrammatically as the curve labeled 110 in FIG. 11. It may be single polar or bipolar, but basically there is some offset level, a lot of noise on it, and a variety of 60 cycle effects. This signal is run through a current to voltage converter, preamplifier 102, where it is AC coupled. Afterwards, it passes through a high-pass filter 104 which takes out any lower frequency fluctuations and then a rectifier 106 from which it emerges with the approximate appearance of curve 112 in FIG. 12. Afterwards, a peak detector 108 operates to generate a signal, labeled as 114 in FIG. 13, which follows the peaks of the rectified sine wave 112 of FIG. 12. This signal is then sent through low-pass filter 110 to provide a signal that is made to vary at a rate that is compatible with the sampling rate of a following A/D sampler of conventional design located on I/O board 20 in computer 14. Typically, the sampling rate of the A/D converter is several hundred to a thousand times a second so fluctuations that occur faster than that are of no interest. Low-pass filter 108 smooths out the signal for this reason as shown by curve 116 in FIG. 14.

Figure 15:
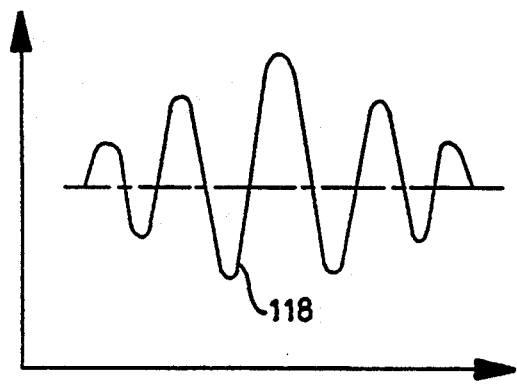
FIG. 15 shows a raw signal out of a photodetector of the invention.
Figure 17:
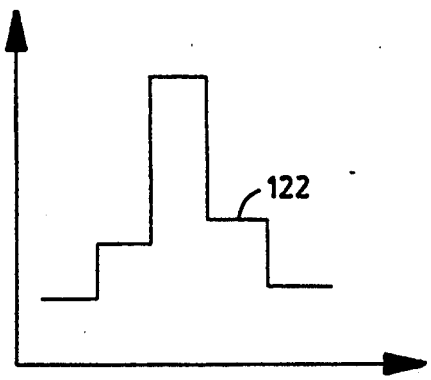
FIG. 17 shows the filtered signal variation of FIG. 16 at the output stage of a peak detector of the invention.
Figure 16:
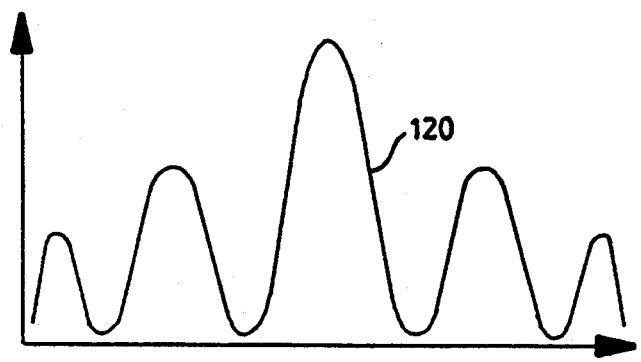
FIG. 16 shows the signal variation with distance at the output end of a high-pass filter of the invention.

Having described the nature of the signal at or near the peak points, its variation with time, or as scanning optical head 50 moves up and down, will now be taken up. FIG. 15 shows with curve 118 how the raw signal out of photodetector 84 varies with time or distance. FIG. 16 shows at 120 the signal variation with distance at the output of high-pass filter 104, and FIG. 17 its variation at the output stage of peak detector 106, designated here as curve 122. This signal is smoothed to provide the final signal for sampling by the A/D converter. Its variation with time or distance is shown by curve 124 in FIG. 18.

Figure 18:
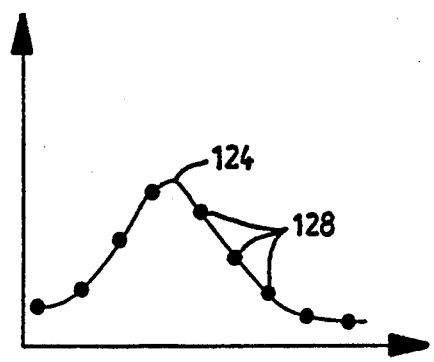
FIG. 18 shows the signal of FIG. 17 after it has been smoothed prior to sampling by an A/D converter of the invention.

The smoothed voltage variation of curve 124, which is changing with scanning head 50 location, several samples are taken with the A/D converter and curve fitting is done to establish where that peak is by fitting a tilted parabola through the data points shown schematically at dots 128 in FIG. 18. Here, it will be remembered that distance is presented as time with the signal starting as a small ripple followed by a large modulation. For purposes of clarity, the modulated signal actually goes through many more peaks which would all be under the envelope. However, only a few are shown here for purposes of illustration.

The signal variations depend on how quickly they peak and on how fast the stepper motor 58 (FIG. 4) is driven. The horizontal axis is distance so, if stepper motor 58, which translates entire scanning head 50, is moving slowly, then there will be many more cycles at a given modulation level. Consequently, peak detector 106 allows for a change in the speed at which stepper motor 58 is driven. What's really being detected is the envelope of those oscillations.

Curve 124, again the slowly varying output, is thus being used to provide the information from which various parameters including curvatures can be determined by subsequent calculation. This changes as a function of distance as shown.

Signal processor 100 is physically located on a board in optical head 12. It's output is fed to the I/O board in computer 14 in response to signals from computer 14 to make A/D conversions. For every signal given, the output signal is sampled and held in a well-known manner in conjunction with the location of the scanning head 50 known by virtue of command signals given to stepper motor 58 after certain commands. In this manner, data points such as those shown at 128 in FIG. 18 are generated and read into an array in computer 14 for subsequent analysis. Through these points, a tilted parabola is fit. Basically, the peak points are found and then a number of points on each side of it—say three on each side, are taken, but not always the three adjacent points. Sometimes, the center point is taken and then every other point going away from it depending on the rates of change involved. This is an option built into the computer software. This way, if there is a more shallow peak, one can obtain a better definition of the parabola.

The factors of importance in choosing grating 72 center around the quality of the finish of the surfaces of an element under test. With system 10, the modulation transfer function (MTF) of the entire optical system is that of microscope objective 70 and the relevant surfaces used for testing. Consequently, the MTF is really determined by the numerical aperture of microscope objective 70. With a 10× objective with an NA of 0.17 about f/3, the diffraction cutoff frequency is about 500 line pairs/mm. This can't be sampled because there will be zero modulation. So, what is required is a frequency that has fairly high modulation which, when passing through focus, is sensitive to the focal position. If the spatial frequency is too low, say one line pair/mm, there is an enormous depth of focus and poor modulation results. Therefore, an intermediate point is needed. It has been found that for measuring radii as well as other parameters, for example, a spatial frequency in the range between 10 and 50 line pairs, or even higher, works well with resolution improving as spatial frequency increases.

Parabolic approximations are used to locate the signal peaks because it is generally recognized as a good approximation to the signal modulation from a lens going through focus, a function which goes as sin x/x. Sin x/x in an approximation around x, goes as roughly $1-x^2/6$.

When system 10 is first calibrated, a nominal radius can be entered so the position of scanning head 50 is roughly known because the working distance of microscope objective 70 is given and its upper possible position is also known. The upper position corresponds to the upper limit switch on scanning head 50 which stops it from crashing into the top test plate. This is found first, and the stage is then backed up to some position lower that the expected longest radius of curvature. The first surface location is then roughly known at this time. Optical head 50 is then backed down and the first surface located. Once this is done, what is done is to back down and take data through where the longest center of curvature should be plus the tolerance and a safety margin so that critical data is not chopped off near the peak. All of the data is stored as the stage travels 10 microns at a step. The position of the signal peaks is kept track of. Once these are established, one then goes to those positions, and the curve fitting is done. Calculations are preferably done from the stored data.

The foregoing discussion applies, of course, to the measurement of parameters along one azimuth. To measure along different azimuths, especially for use in measuring toric surfaces, the test element may be rotated by the rotary table assembly 38 under the influence of stepper motor 52 (See FIGS. 4 and 19). Assembly 38 is rotated in precise angular intervals under the control of computer 14. For this purpose, motor 52 is drivably connected to assembly 38 via a sprocket 140 at its output shaft. Sprocket 140 connects with another sprocket 146 fixed to lens mount 42 via a flexible belt 144. The angular interval through which a test surface can be rotated depends in the usual way on the ratio of the sprocket diameters and stepper motor angular resolution. However, it should be clear that the interval can be set simply by setting the number of motor pulses to correctly achieve the desired angular movement. Thus, with assembly 38 in conjunction with computer 14, measurements at each angular position can be made.

In the rotational mode of operation, the grating orientation remains unchanged—what is changing is the angular orientation of the part with respect to the grating arrangement. It will be appreciated that there is a preferred orientation of the grating which is tangential to the center of its rotation. At the same time the position of the grating in front of the detector its radially orthogonal to the incoming ray cone but inverted, rather than overlapping exactly when in phase.

Figure 9C:
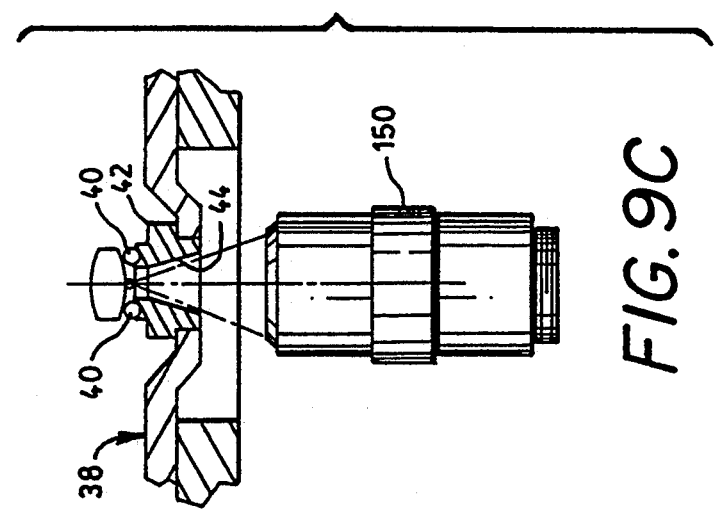
FIG. 9c is similar to FIGS. 9a and 9b except showing the use of a microscope objective having a smaller working distance and thus more limited range of measurement.
Figure 9B:
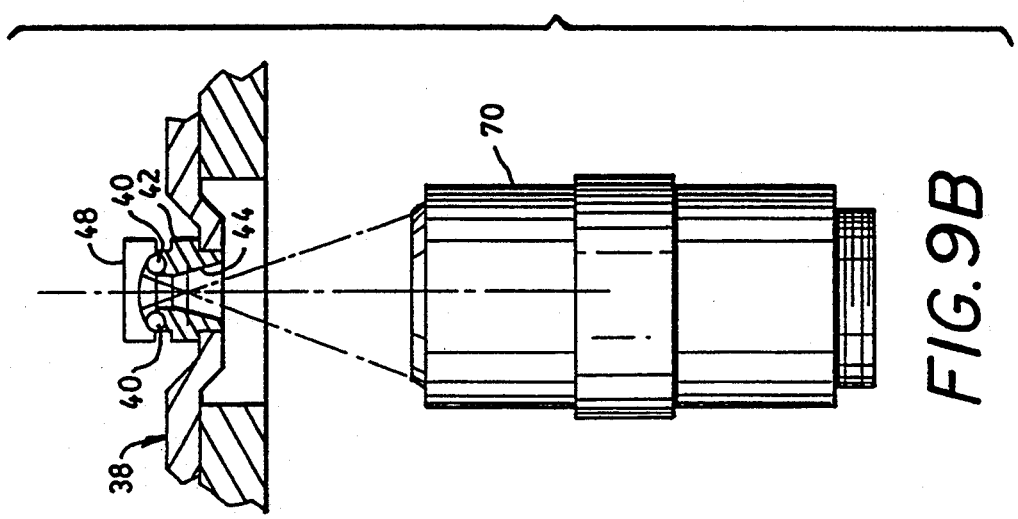
FIG. 9b is similar to FIG. 9a except that it illustrates the use of the inventive system in the measurement of a plano-concave lens.
Figure 9A:
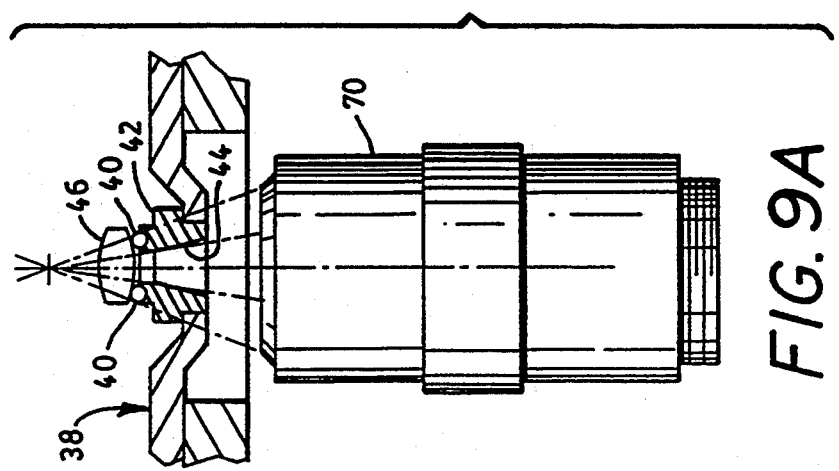
FIG. 9a is a partial vertical section of part of the optical head of the system of FIG. 5 taken along line 9a–9a thereof illustrating the use of the inventive system in the measurement of a biconvex lens.

As shown in FIG. 9c, system 10 can be used with a smaller and less expensive microscope objective 150, but in this case, its smaller working distance reduces the range of parametric values that can be measured.

Control and operator interfacing with system 10 is provided via a software program coded in a well-known manner to behave in accordance with the following functionality. The coding may be in any suitable computer language such as Basic or "C".

The computer system will boot-up directly into its program. Then the user will be prompted to enter a 1, 2, or 3. Option 3 allows the user to run DOS or other applications while Option 1 initiates the Program without the ability to calculate back vertex power (BVP) and Option 2 the ability to calculate it every time a front surface radius of curvature is measured.

STARTING THE PROGRAM

To use the program, the computer is simply turned on. If the computer is already on, holding down the combination of cntrl-alt-del keys will re-boot the system and commence program execution. There are an number of files required for the program to run. They include:

| | |
|---|---|
| COMPANY.EXE | Executable program |
| COMPANY.CON | Configuration file |
| MONOMER.DAT | Monomer data file |
| BEGINN.SCR | Program screen files |
| ENTDA.SCR | TEST.SCR |
| ENTDA0.SCR | BVP1.SCR |
| ENTDA2.SCR | BVP2.SCR |
| ENTDA20.SCR | TEST1.SCR |
| ENTDA3.SCR | ROT.SCR |
| TITLE.SCR | TITLE21.SCR |
| ZSCANP.SCR | TITLE2.SCR |
| SETINT1.SCR | |
| AUTOMD1.SCR | |
| FINDCNTR.SCR | |
| CALORAUT.SCR | |
| RADIUS.SCR | |
| BLUE.SCR | |
| BVP.SCR | |
| THICKNESS.SCR | |

The Program is initiated from DOS by typing PROGRAM NAME and the enter key. To activate the BVP calculation COMPANY MONOMER is typed and entered. The part to be measured is then placed so that it rests on the three balls (40) located on the top of the instrument. The part should rest squarely on balls (40) so that the center of the part is measured. If the part is tilted, an off-axis portion of the part will be measured. This problem can be eliminated by precisely centering the part under test with a centering fixture.

USING THE PROGRAM

After starting the Program, a company logo and license screen appears and be displayed for a few seconds. Then the main data entry menu is displayed on the monitor. The user is then prompted for the name of the operator, the nominal parameters of the part including the radius of the mold and the tolerance of the mold (the default is 0.100) and the mold id. These can be entered using the keyboard, arrow, and enter keys. The tolerance is the full width of the acceptable range centered about the nominal values. After the last entry is made the main menu is displayed. The main menu lists the active function keys. The two major options available are to measure enter a radius measuring mode of a thickness measuring mode in which the thickness, power and focal length of a lens may measured and displayed.

FUNCTION KEYS

The commands for the different features in the Program are given via the function keys which are preset as follows and also displayed on the main menu screen:

F1> ROTARY SETUP; This feature allows the user to select the number of azimuths measured across the part and the angular increment between positions.

After typing the "F1" key, a new screen is displayed on the terminal. This screen first exhibits the current number of positions and prompts the user for input. After entering the number of positions, the user can then enter the angular increment between positions (in degrees).

F2> INTENSITY; This feature allows the user to measure the relative intensity read by the detector at the current position.

After typing the "F2" key, a new screen is displayed on the terminal. This screen exhibits "INTENSITY", and then prints in white the intensity being read.

F3> NEW PART; This feature allows the user to enter data for a new part into the program.

After typing the "F3" key, a new screen is displayed on the terminal. The user is then prompted for the name of the operator, the parameters of the part such as its radius if a mold, the tolerance of the part (the default is 0.100) and the part id. If the program was initiated using option 1 or the COMPANY MONOMER command, a second screen follows which prompts the user for the measured mold radius, the lens center thickness, and monomer type. This information may be used in all subsequent calculations so that both BVP and Label Power may be calculated and displayed.

(NOTE: After using this function, the program recognizes that a new pat has been entered and will not allow the usage of MEASURE RADIUS (F5) until the new surface image has been found via CALIBRATE (F4) or AUTOMATIC MODE (F6). MEASURE RADIUS requires that the surface image be found before it can measure a radius.)

F4> CALIBRATE; This feature allows the user to manually calibrate a new surface point, find a radius, and print a graph of intensity versus microns. After typing the "F4" key, a new screen which reads "CALIBRATING" is displayed on the terminal. For the next several seconds, the motor will move as it locates the surface and measures the radius. If graphing has been enabled using the "G" command, a graph of intensity versus distance in microns will appear when the calibration is complete. This graph covers all intensity readings from a point which is 0.6 times the tolerance before the center to a point ending 0.6 times the tolerance after the surface. Thus the graph gives a full reading across the length of the mold. After a few seconds the graph will disappear and the calculated radius will be displayed until the user hits the "return" key.

After a Calibration has been performed, the program now has in its memory a new surface or first surface peak location. MEASURE RADIUS (F5) may now be used to manually find new center points for different molds and measure their radii.

F5> MEASURE RADIUS; This feature allows the user to manually measure the radii of different molds and print a graph of the area about the center point. If multiple azimuths are measured, the average, maximum and minimum radius will be displayed.

If data for a new part has just been entered via NEW PART (F3) or by the initial activation of the program, then the measure radius routine will not allow a new measurement until a new surface image has been found via CALIBRATE (F4) or AUTOMATIC MODE (F6). If "G" is typed before the F5 key or the red button is depressed a graphical display of the center peak will be toggled off or on. This graph starts at a point which is 0.6 times the tolerance before the center and ends the same distance after it. After a few seconds the graph will disappear and the calculated radius will be displayed until the user hits the "return" key, FS, or the red button on the optical head. The graph may be retained on the screen by striking any key while it is displayed. Operation will continue when a key is struck again. This graph will be displayed after every subsequent radius is measured. To retain the graph on the screen strike any key while the graph is displayed. Operation will continue when another key is struck. To stop the graphing process, type "G" again.

The red button (41 in FIG. 5) functions identically to the F5 key and allows the user to test a batch of parts without striking the keyboard. If the MONOMER option has been activated then both BVP and Label power will be calculated and displayed.

F6> AUTOMATIC MODE; This feature finds the first surface peak, allows the user to measure the radii of an infinite number of molds with the options of printing the graphs of the center peaks and of writing the measured radii and other data to a file. The red button (41) on the top of the optical head signals computer 14 that a part is in place ready for measurement.

CALIBRATING SURFACE; After typing the "F6" key, a new screen with a variety of data about the mold, molds or parts being tested is displayed. In the lower left comer is a box labeled "STATUS". Within this box one of the four status modes will be display. For the next several seconds the motor moves as it locates the surface point. While it is doing this, a star is printed in the status box next to "CALIBRATION/SETUP". When the motor stops moving, a star will be printed in the status box next to "READY FOR LOAD/UNLOAD", and AUTOMATIC MODE is now ready to measure radii.

MEASURING RADII; The status box will star "READY FOR LOAD/UNLOAD" when it is ready to measure. With a mold loaded on the bench, the button 41 is pressed. The status box stars "MEASUREMENT UNDERWAY". Within three seconds the radius will is measured and the status box will star "MEASUREMENT COMPLETE" and "READY FOR LOAD/UNLOAD". The radius of the lens is displayed in the lower right corner along with a variety of other data on the center of the screen. If the Monomer option has been activated then the BVP is displayed to the left of the radius. The Program is now ready for further measurements. As well as the radius, the program displays after each measurement: the nominal radius, tolerance, number of parts measured and accepted, number of parts long and short, the mean radius of those parts accepted and their standard deviation. Also, next to where the radius is displayed an "L", "S" or "G" is indicated, depending on whether the radius was long, short or within tolerance. If it were within the upper third of the tolerance a "+" is printed next to the "G", if in the lower third, a "−". To exit AUTOMATIC MODE return is pressed. NOTE: Upon exiting AUTOMATIC MODE all data is LOST unless it was otherwise saved in a file.

WRITING TO A FILE; When the user first enters the actual radius measurement portion of AUTOMATIC MODE, the Program prompts at the top of the screen "Do You Wish To Write To A File?". If the user replies "Y", the program requests the name of the file. The file name can include drive and path selection. The program next asks whether to write the individual radii calibrated to a file, if the reply is "Y", then the radii and other data (mean radius, standard deviation, # accepted, etc.) is stored in the file, otherwise just the other data is stored. A sample data file is listed below.

, "16:40:37"
"SDF", "RMI TEST 1"
"MEASUREMENT:"
8.118,"G",""
8.120,"G",""
8.118,"G",""
8.119,"G",""
8.121,"G",""
8.120,"G",""
8.120,"G",""
8.118,"G",""
8.119,"G",""
8.121,"G",""
8.118,"G",""
8.114,"G",""
8.120,"G",""
8.118,"G",""
8.119,"G",""
8.118,"G",""
8.119,"G",""
8.120,"G",""
8.117,"G",""
8.117,"G",""
"Nominal Radius=",8.1
"Tolerance",.2
"High=",0
"Low=",0
"Good=",20
"Number Tested=38, 20
"Mean of Radii=",8.1187
"Standard deviation=",1.564812E-03

The first line contains the date and time. The second line lists the operator and the part identification. The third line indicates that the individual radius measurements follow. The individual measurements are listed as the radius, a letter code (G for good, L for long radius, S for short radius, T for low signal level, or B for bad reading) followed by a "+","−", or ""qualifier if the part measures "G". The "B" code signifies that the radius measurement was not successful. This may be due to an unusually long or short radius, or a missing part during the read. The "T" code usually indicates a low signal due to a deformed part, dirty surface, or defective lamp. At the end of the list, the nominal radius and tolerance are listed as well as a statistical summary of the parts measured. The mean radius and standard deviation include only passing parts (i.e. parts measuring G+,G, or G−). If the operator chose not to include individual radii in the file, the statistical summary is still included. If multiple azimuths are measured, then the average radius as well as the individual measurements are stored.

If the Monomer option has been activated, then the BVP for each measurement is stored as well as the average BVP and the characteristics of the monomer (refractive index, and hydration expansion factor).

If any errors are encountered while trying to work with the file, an error message is printed at the top of the screen, the file is no longer written to and the program pauses in execution until the user hits the return key. If any such errors do occur, however, the program stays in the automatic mode, prompts the operator, and is ready to continue measuring radii.

GRAPHING THE CENTER PEAK; Hit the "G" key at any time during the radius measurement portion of AUTOMATIC MODE to see a graph signal. After the radius is measured, the screen is clear and a graph starting at a point 0.6 times the tolerance before the center peak, to a point 0.6 times the tolerance after the peak is printed. This graph is displayed after every subsequent radius is measured. To retain the graph on the screen strike any key while the graph is displayed. Operation continues when another key is struck. To stop the graphing process, type "G" again.

F7> RESTART PROGRAM; After typing the "F" key, the program will re-start from the beginning.

F8> BVP CALCULATOR; After typing the "F8" key, the program displays a screen requesting the lens/mold radius, the measured mold radius, the lens center thickness, and the monomer type. The program then calculates and displays the Back Vertex Power and Label Power. The user must hit the esc key to exit this menu. BVP is defined as:

$$BVP = 1000*[\{Rm/(N-1) - t/N\} - 1 + (1-N)/Rb]/E$$

where
    N is the refractive index,
    E is the hydration expansion factor,
    t is the center thickness (dry=wet thickness/E),
    Rb is the Back curve radius (dry=BCOR), and
    Rm is the measured lens/mold radius.
    All linear units in mm.

F9> BCOR CALCULATOR; After typing the "F9" key, the program displays a screen requesting the aim back vertex power, the measured lens/mold radius, the lens center thickness, and the monomer type. The Program then calculates and displays the BCOR. The user must hit the esc key to exit this menu. BCOR is defined as:

$$BCOR = 1000*(1-N)/[(BVP*E - 1000\{Rm/(N-1) - t/N\} - 1]$$

where
    N is the refractive index,
    E is the hydration expansion factor,
    t is the center thickness (dry=wet thickness/E),
    BVP is the aim back vertex power, and
    Rm is the measured lens/mold radius.
    All linear units in mm.

T>THICKNESS; After typing the "T" key, the program enters an option in which it acquires the locations of the front surface vertex, the rear surface vertex and the centers of curvature of the front and rear surfaces. It then proceeds to determine the front surface radius, the shift, the thickness, the powers of the front and rear surfaces and the overall power of the element under test. All of these results are displayed, stored and/or written to disk. All calculations in this mode are made in accordance with the equations and relationships already discussed earlier in connection with the explanation for the various parameters illustrated in FIG. 6.

F10> END; After typing the "F10" key, program execution ends.

Esc>ESCAPE; When in any of the function modes, pressing the Esc (escape) key causes the program to exit the current routine and return to the main menu.

EDITING THE MONOMER.DAT FILE

The MONOMER.DAT file contains the name, refractive index, and hydration expansion factor data which is used to calculate back vertex and label power. The name for the monomers is 1 upper-case letter (A–Z), and the data must is entered according to the following format.

"A","1.436","1.129"
"B","1.150","1.065"
END

Up to 26 monomer types may be included. The MONOMER.DAT file is in ASCII format and can be easily edited using the EDIT.EXE editor. Typing "EDIT MONOMER.DAT" initiates editing of the monomer data file. The user is then able to edit the file in full screen format. Typing "F1" key saves the modified file. Complete instructions are available by typing "F10".

CHANGING KEY VARIABLES VIA THE CONFIGURATION FILE

It is possible to externally change certain key variables in the main program via direct editing of the configuration file, COMPANY .CON. This is an ascii format file which may be edited from DOS using the editor, EDIT.EXE. These variables in the file are of the form "variable name", value with the name of the variable in quotation marks, followed by its value. If the values to these variables are changed, this form must be maintained. The variables in the file are:

"NTIMES",1—NTIMES controls the number of times the photo detector is read and averaged each time a call is made to read the intensity. If NTIMES is increased, the accuracy is increased very slightly, but the speed of the program is greatly decreased.

"SSSTEP",3—SSSTEP determines the distance in motor steps separating the points used to determine the least square's best fit for the approximation of the graph of the surface peak. A value of two or three has proven to produce the most accurate approximation.

"CSSTEP",3—CSSTEP determines the distance in motor steps separating the points used to determine the least square's best fit for the approximation of the graph of the center peak. A value of two or three has proven to produce the most accurate approximation.

"THRSSHLD",800—THRSSHLD determines the minimum allowable peak intensity for a center or surface peak.

"CALAGAIN",50—In AUTOMATIC MODE, CALAGAIN determines the number of times measurements of radii can be made before the AUTOMATIC MODE re-calibrates a new surface point to insure that the motor has not slipped any steps in its measuring.

"GRMAX",1024—GRMAX determines the maximum intensity value of the graphs.

"PTHRESH",800—PTHRESH determines the threshold for peak detection at the surface.

"TOLER",0.1—TOLER is the default radius tolerance (mm.).

"NRADIUS",8.0—NRADIUS is the nominal radius (mm.).

"ANGLE",45—This specifies the angular increment between azimuths.

"ROTATE",1—This specifies the number of azimuths to be measured.

"SCFACTOR",1.25—This specifies the level below which low threshold parts are deemed bad. Thus, any part whose measured radius is below the value of (THRSSHLD/SCCFACTOR) will be considered a bad part and no radius will be returned in the manual measurement mode.

The default values listed are suggestions. If the reflectance of the part under test changes substantially, the operator will want to alter the threshold values THRSSHLD and PTHRESH. If the graphs substantially overfill or underfill the axes, the value of GRMAX should be adjusted. If any changes are made in the configuration file, it is essential that at the file's end "END",0 is written or else an error message will be incurred.

The editor may be invoked by entering "EDIT COMPANY.CON" from DOS. This will initiate the editor. The user will then be able to edit the file in full screen format. Typing "F1" key will save the modified file. Complete instructions are available by typing "F10".

Figure 22:
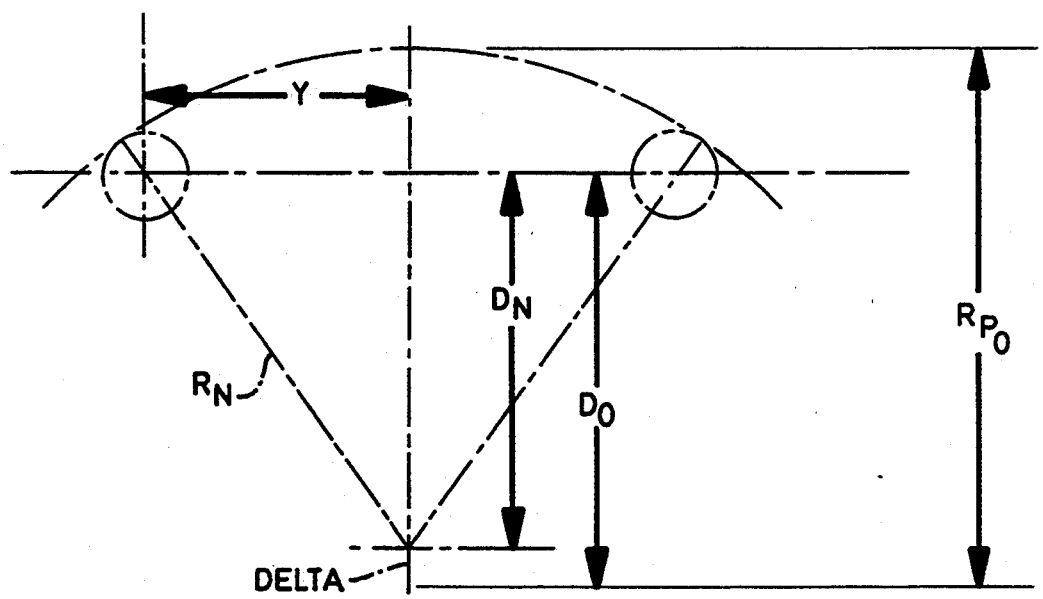
FIG. 22 is a diagrammatic illustration of the measurement geometry showing various parametric relationships used in a rapid calculation algorithm for determining test part radius with knowledge of a reference part radius and differences in the various parameters shown.

In the automatic and manual modes, a special algorithm is used to increase the speed of operation of system 10 when measuring first surface radius. It is based on the mathematical equations relating sag height to the reference plane defined by balls 40 taking into account the radius of the balls. System 10, to save time and full travel for each measurement, determines instead of the radius of curvature for each test surface, measures the difference in the position of the center of curvatures between the first part measured during calibration mode and every subsequent part. Then, from the geometry shown in FIG. 22, it computes the difference in sag height for each part using the following equation:

$$R_{PN} = \rho + \sqrt{D_N^2 + Y^2}$$

Once a calibration is done to physically measure the vertex and location of the center of curvature of the calibration part, the systems positions scanning head 50 at or below C1, the calibration part curvature position. For every subsequent measurement on the same approximated radius part, the difference in location of the center of curvatures, which is equal to, say, C2–C1 is computed. The difference is sag is then computed from: sag=$R_i - (R_1^2 - y^2)^{\frac{1}{2}}$. Y is the distance between balls 40. R is the radius of curvature. The new radius then equals $\Delta C - \Delta S$.

Figure 20:
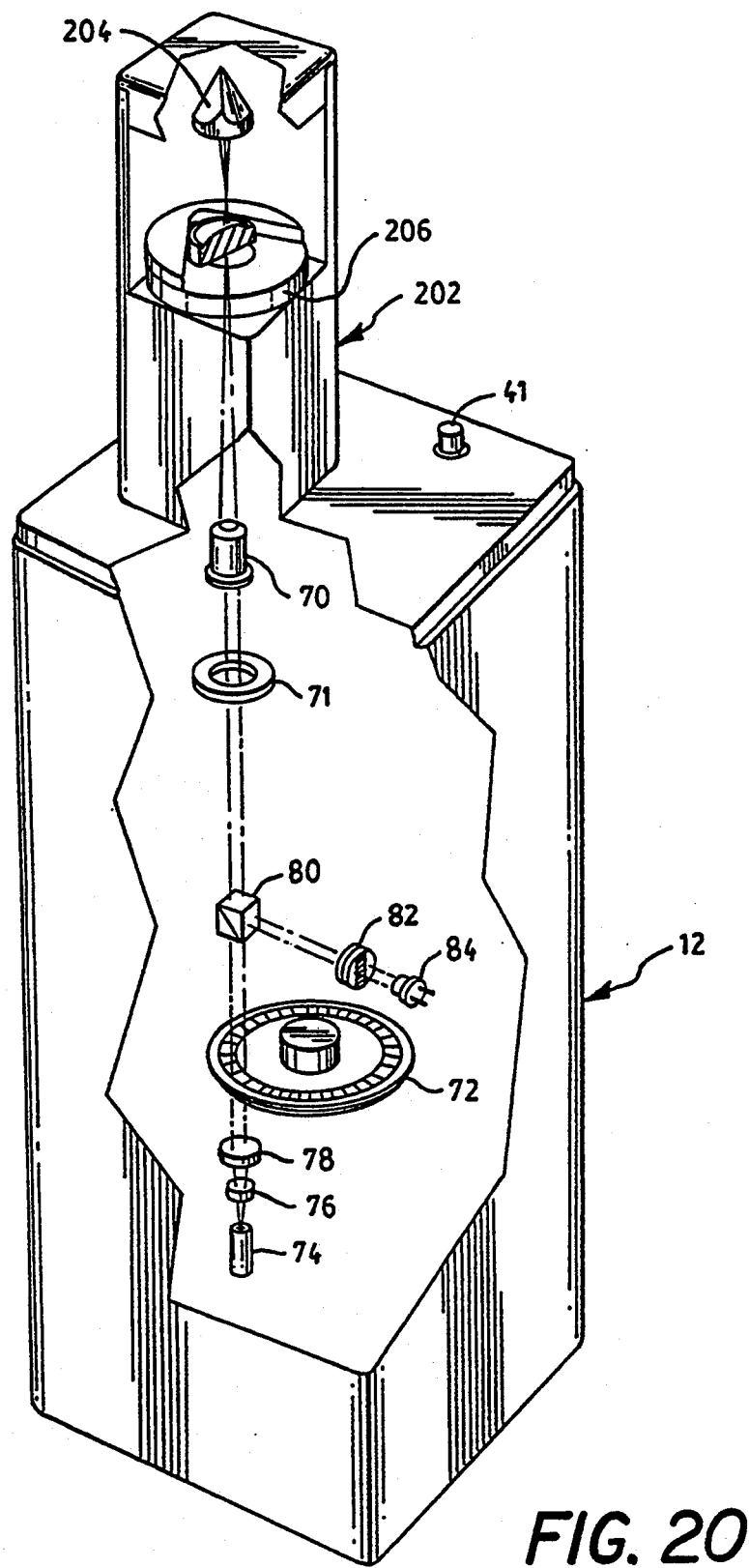
FIG. 20 is a diagrammatic perspective of the optical head of another embodiment of the inventive system for measuring flange focal length.
Figure 21:
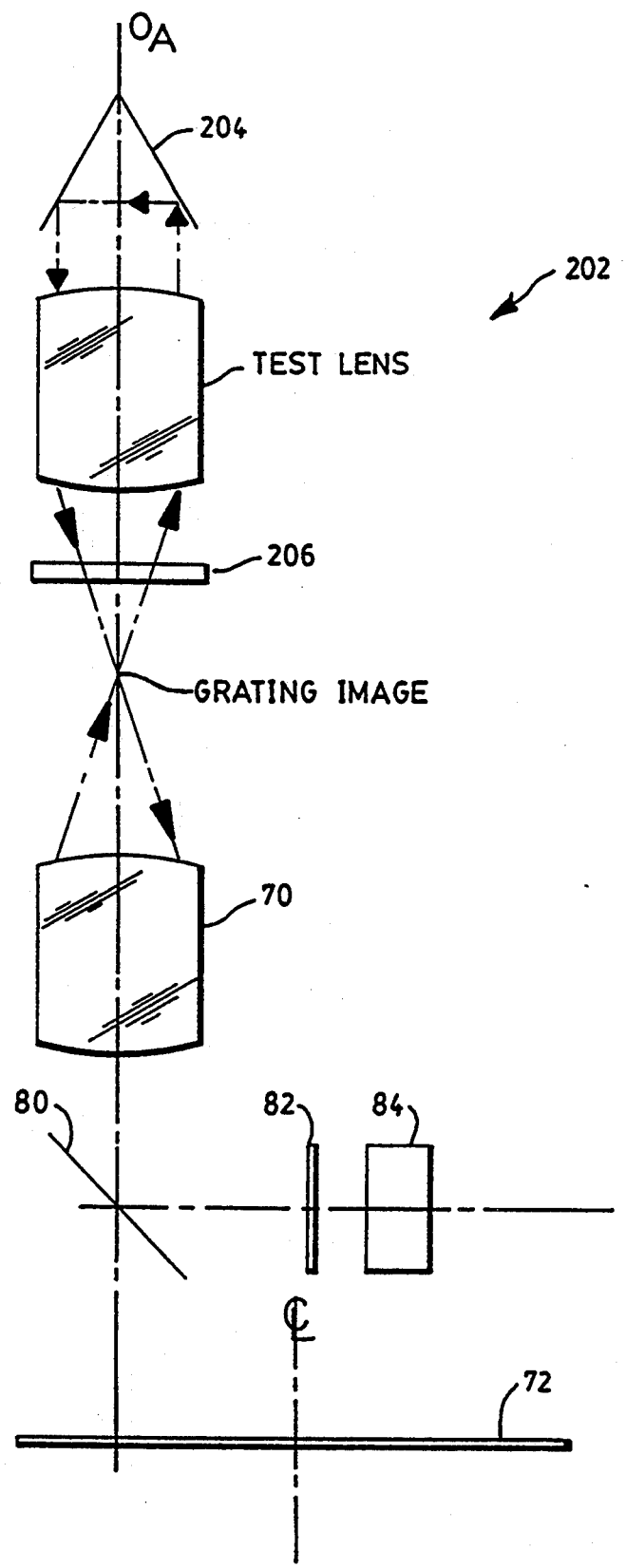
FIG. 21 is a diagrammatic elevation of the embodiment of FIG. 20 illustrating its measurement methodology.

Another embodiment of the invention is shown in FIGS. 20 and 21 where it is designated generally at 200. This version is for the measurement of back focal length or vertex focal length. System 200 measures back focal length in one azimuth and its use is limited to lenses of positive or net positive power. To do this the reference plane is replaced with an autocollimation system 202 that has a reference flat 206 and a retro lens 204. Thus, reference flat 206 comprises a means for defining a reflective surface along a longitudinally extending reference axis. As can readily be seen, retro lens 204 is positioned a fixed distance along the reference axis with its own optical axis aligned therewith. Here, a test lens is supported and positioned above reference flat 206 at a test station between it and retro lens 204 so that its optical axis is in alignment with reference flat 206 and its mounting flange position with respect to reference flat 206 is readily determinable. As before, a real image is formed and moved along the reference axis, toward and away from the surface to be measured, while an electrical signal is generated as a function of the position of the real image along the reference axis. The electrical signal peaks, as before, as the real image passes through the focal point of the test lens and the vertex of reference flat 206. The signal is monitored as before and the distance between the positions at which the signal peaks is correlated with the flange focal length of the test lens by simple arithmetic operations well-known to the art.

Structured in this way, system 200 represents an autocollimation scheme with the software program modified in a well-known manner to look for focus instead of radius. So the peak here, especially a multielement lens is at its focus.

Other variations of the invention will be obvious to those skilled in the art. For example, the illumination system and target may be of other design. A pin hole and unmodulated source could work but at reduced signal levels.

Those skilled in the art may make other changes without departing from the scope of its teachings. Therefore, it is intended that the embodiments shown herein be considered illustrative and not in a limiting sense.

What is claimed is:

1. Apparatus for measuring optical parameters of lenses comprising convex or concave surfaces, said apparatus comprising:
    means for supporting and positioning a lens to be measured in a predetermined position with the centers of curvature of its surfaces lying substantially along a longitudinally extending axis;
    means for forming a real image in an image plane and automatically moving said real image along said longitudinal axis, toward and away from the lens, such that the surfaces of the lens form reflected images of said real image, the quality of focus of which varies as a function of the position of said real image with respect to the surfaces of the lens;
    means for evaluating said quality of focus of said reflected image in said image plane and generating an electrical signal whose amplitude varies in accordance with variations in said quality of focus of said reflected image and peaks as said real image passes through first positions along said longitudinal axis corresponding to the center of curvatures of surfaces of the lens and second positions along said longitudinal axis corresponding to the vertices of the surfaces of the lens; and
    means for monitoring said electrical signal, measuring the distance between predetermined ones of said first and second positions where said electrical signal peaks, and determining the parameters of the lens including the radii of the surfaces of the lens, its center thickness, power, index of refraction and focal length.

2. The apparatus of claim 1 wherein said real image is an extended real image having a predetermined spatial frequency and the measure of said quality of focus of said reflected image is its contrast at said predetermined spatial frequency.

3. The apparatus of claim 2 wherein said means for forming an extended real image in an image plane and automatically moving said extended real image along said logitudinal axis comprises:
    (a) an optical head that is mounted for movement as a unit along said longitudinal axis; and
    (b) means for selectively driving said optical head along said longitudinal axis toward and away from the lens to be measured so that, as said extended real image passes through the lens surface's center of curvature and vertices, it is reflected off the surfaces in turn and back along said longitudinal axis with optimal contrast in said image plane.

4. The apparatus of claim 3 wherein said optical head comprises:
    (a) a target;
    (b) a source for illuminating said target;
    (c) an objective lens for imaging said target in said image plane which is at a predetermined location from said optical head as measured along said longitudinal axis;
    (d) detector means positioned at an offset location with respect to said longitudinal axis;
    (e) means for providing a folded optical path between said objective lens and said detector means so that both said target and said detector means can view along said longitudinal axis toward the lens to be measured as said optical head moves toward and away from the lens to be measured.

5. The apparatus of claim 4 wherein said source comprises an LED.

6. The apparatus of claim 4 wherein said means for combining the optical paths between said target and said detector means comprises a beamsplitter located between said detector means and said location at which said real image is formed.

7. The apparatus of claim 4 further including an adjustable diaphragm for adjusting the illumination from said source falling on said target to adjust the brightness of said real image to regulate signal strength.

8. The apparatus of claim 3 wherein said target comprises a grating.

9. The apparatus of claim 8 wherein said grating has a spatial frequency in the range between 1 and 400 line pairs per centimeter.

10. The apparatus of claim 8 wherein said detector means comprises a single photodiode and a grating positioned upstream of said photodiode.

11. The apparatus of claim 10 wherein said target and photodiode grating are fixed with respect to one another so that one rotates relative to the other.

12. The apparatus of claim 3 wherein said means for selectively driving said optical head along said longitudinal axis comprises a precision lead screw coupled with said optical head and a stepper motor for rotating said lead screw in precise angular increments.

13. The apparatus of claim 2 wherein said extended real image comprises a changing pattern of illumination.

14. The apparatus of claim 1 wherein said means for supporting and positioning a surface to be measured comprises three balls.

15. The apparatus of claim 1 wherein said means for supporting and locating a lens to be measured further includes means for rotating the lens so that the parameters of the lens can be measured along different angular azimuths.

16. The apparatus of claim 1 wherein said means for monitoring, measuring and determining the parameters of a lens comprise a general purpose computer and an input/output board configured to sample said signal as a function of the position of said reflected image, fit a curve to it to establish said peaks, and calculate the selected distances between said peaks.

17. A method for measuring optical parameters of lenses comprising convex or concave surfaces, said method comprising the steps of:
supporting and positioning a lens to be measured in a predetermined position with the centers of curvature of its surfaces lying substantially along a longitudinally extending axis;
forming a real image in an image plane and automatically moving said real image along said longitudinal axis, toward and away from the lens, such that the surfaces of the lens form reflected images of said real image, the quality of focus of which varies as a function of the position of said real image with respect to the surfaces of the lens;
evaluating said quality of focus of said reflected image in said image plane and generating an electrical signal whose amplitude varies in accordance with variations in said quality of focus of said reflected image and peaks as said real image passes through first positions along said longitudinal axis corresponding to the center of curvatures of surfaces of the lens and second positions along said longitudinal axis corresponding to the vertices of the surfaces of the lens; and
monitoring said electrical signal, measuring the distance between predetermined ones of said first and second positions where said electrical signal peaks, and determining the parameters of the lens including the radii of the surfaces of the lens, its center thickness, power, and focal length.

18. The method of claim 17 wherein the center thickness of a lens comprising first and second surfaces is governed by the following equation:

$$t = \frac{\text{shift} N'}{N + (N' - N)\text{shift}/R_1}$$

where:
shift is the distance along said longitudinal axis between a signal peak corresponding to the first surface vertex and a signal peak corresponding to the second surface vertex as seen through the first surface,
t is the axial thickness of the lens,
N is the index of refraction of the surrounding medium with air being 1.0,
N' is the index of refraction of the lens, and
$R_1$ is the radius of the first surface with positive radii having their center of curvatures to the right of surfaces.

19. The method of claim 18 wherein the radius of the second surface is given by:

$$R_2 = \frac{-L_0(N'/N)}{1 - (LN_0\phi_1/N)} - t$$

where:
$R_2$ is the radius of the second surface,
$L_0$ is the distance between selected signal peaks,
N' is the index of refraction of the lens,
N is the index of refraction of the surrounding medium and is 1.0 for air, and
$\phi_1$ is the power of the first surface and is given by:

$$\phi_1 = \frac{N' - N}{R_1}$$

where:
$\phi_1$ is the power of the first surface,
$R_1$ is the radius of the first surface,
N' is the index of refraction of the lens, and
N is the index of refraction of the surrounding medium and is 1.0 for air, and all positive radii have their center of curvatures to the right of surfaces.

20. The method of claim 19 wherein the power of the lens is given by:

$$\phi = (N' - 1)(1/R_1 - 1/R_2) + \frac{t(N' - 1)^2}{N'R_1R_2}$$

where:
$\phi$ is the power of the lens,
$R_1$ is the radius of the first surface,
$R_2$ is the radius of the second surface,
t is the thickness of the lens, and
N' is the index of refraction of the lens.

* * * * *